(12) United States Patent
Kimura

(10) Patent No.: US 8,218,162 B2
(45) Date of Patent: Jul. 10, 2012

(54) IMAGE PROCESSING DEVICE

(75) Inventor: Hiromi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 689 days.

(21) Appl. No.: 12/371,250

(22) Filed: Feb. 13, 2009

(65) Prior Publication Data

US 2009/0213406 A1    Aug. 27, 2009

(30) Foreign Application Priority Data

Feb. 22, 2008    (JP) ................. 2008-041966

(51) Int. Cl.
*G06F 3/12* (2006.01)
(52) U.S. Cl. ....... 358/1.13; 358/1.2; 358/1.15; 358/1.16
(58) Field of Classification Search .......... 358/1.2, 358/1.13–1.16, 528, 451, 504, 406; 382/298–299; 709/220, 228, 246
See application file for complete search history.

(56) References Cited

U.S. PATENT DOCUMENTS

| 2003/0161010 A1* | 8/2003 | Schinner ............ 358/474 |
| 2004/0100656 A1 | 5/2004 | Kuroki ............. 358/1.16 |
| 2007/0121153 A1* | 5/2007 | Shinkai ............ 358/1.15 |
| 2008/0180707 A1* | 7/2008 | Kanematsu ......... 358/1.9 |

FOREIGN PATENT DOCUMENTS

| JP | 10-143414 A | 5/1998 |
| JP | 2004-178284 A | 6/2004 |

* cited by examiner

*Primary Examiner* — Charlotte M Baker
*Assistant Examiner* — Aaron R Gerger
(74) *Attorney, Agent, or Firm* — Fitzpatrick, Cella, Harper & Scinto

(57) ABSTRACT

When transmitting a document file stored in a box of a device such as an information processing device to an image processing device via a network, reduction in transfer time of a document file is aimed at. The image processing device has a unit for reading a document and for generating original image data, and a unit for inputting transfer size information of a bitmap. The image processing device transmits the transfer size information in addition to a data transfer request of the document file to another device in accordance with document file information including data about the document from at least part of an area of the original image data. The image processing device extracts at least part of the original image data in accordance with metadata contained in the document file received, and converts the original image data extracted to vector data.

8 Claims, 21 Drawing Sheets

| ORIGINAL DOCUMENT | SCANNED IMAGE | DOCUMENT PRINTOUT IMAGE | PROCESSING |
|---|---|---|---|
| COLOR | COLOR | COLOR | EXECUTE DATA AMOUNT DECISION PROCESSING |
| | COLOR | MONOCHROME | PRECEDENCE OF SCAN DATA |
| | MONOCHROME | COLOR | PRECEDENCE OF DOCUMENT DATA |
| | MONOCHROME | MONOCHROME | PRECEDENCE OF SCAN DATA |
| MONOCHROME | MONOCHROME | COLOR | PRECEDENCE OF DOCUMENT DATA |
| | MONOCHROME | MONOCHROME | EXECUTE DATA AMOUNT DECISION PROCESSING |

FIG.20

| ORIGINAL DOCUMENT | SCANNED IMAGE | DOCUMENT PRINTOUT IMAGE | PROCESSING |
|---|---|---|---|
| HIGH RESOLUTION | HIGH RESOLUTION | HIGH RESOLUTION | EXECUTE DATA AMOUNT DECISION PROCESSING |
| | LOW RESOLUTION | | PRECEDENCE OF DOCUMENT DATA |
| | HIGH RESOLUTION | LOW RESOLUTION | PRECEDENCE OF SCAN DATA |
| | LOW RESOLUTION | | PRECEDENCE OF SCAN DATA |
| LOW RESOLUTION | LOW RESOLUTION | HIGH RESOLUTION | PRECEDENCE OF DOCUMENT DATA |
| | LOW RESOLUTION | LOW RESOLUTION | EXECUTE DATA AMOUNT DECISION PROCESSING |

FIG.21

IMAGE PROCESSING DEVICE

BACKGROUND OF THE INVENTION

1. Field of the Invention

The present invention relates to an image processing device for providing an original document printing.

2. Description of Related Art

There is a system that stores scan data in a storage device. The scan data being acquired by reading an original paper document with an image reading device such as a scanner, The scanned data is stored as document data and can be printed when making a copy of the same document later. The document data corresponds to the original paper document as it is read from the storage device. When making a copy of the paper document by using an image processing device such as an MFP (Multi-Function Peripheral), the system uses the document data corresponding to the original paper document rather than the scan data of the paper document as the data for printing. This makes it possible to obtain a higher quality printout. An example of the system is disclosed in Japanese Patent Laid-Open No. H10-143414 (1998). The example disclosed in Japanese Patent Laid-Open No. H10-143414 (1998) is as follows. First, at printing, a bar code representing document management information regarding the document data is printed together with the document data. Next, when making a copy of the paper document having the printed document data, the system searches the document data corresponding to the paper document in accordance with the document management information detected on the paper document, and reads out and prints the document data.

On the other hand, depending on the format of the document file, there are some image processing devices that cannot start image processing for printing until such image processing devices receive all the document data constituting a document file. In other words, such an image processing device cannot execute the image processing unless it can reserve available space capable of receiving the entire document within a data storage area in the internal storage device. An example of the system corresponding to such an image processing device is disclosed in Japanese Patent Laid-Open No. 2004-178284. Japanese Patent Laid-Open No. 2004-178284 discloses a system in which a device such as a computer on a transmitting side adjusts the amount of document data to be transmitted in accordance with the available space within the data storage area in the image processing device on the receiving side. In the system, the device on the transmitting side compares the available space within the data storage area in the image processing device on the receiving side with the amount of all the document data to be transmitted, and determines as to whether the image processing device can store all the document data or not. If it decides that it cannot store the data, the device on the transmitting side reduces the amount of document data to be transmitted so as to match the amount of available space within the data storage area of the image processing device. More specifically, the device on the transmitting side reduces the amount of data to be transmitted by performing data conversion on a specified object contained in the data to be transmitted.

In addition, there is a system having a server for storing document data within a network, wherein the server that receives a transmission request of the document data from an image processing device, and transmits the document data requested from the image processing device that sends the transmission request. According to the system, a user can print out the document data repeatedly by reading from the server. Here, a function of storing the document data in the storage device of the server in a file format is referred to as a box function and the file system is called a box.

The contents of the file stored in the box are scan data transferred from the image processing device or print data transferred from a host computer via a network. The file is stored in the box in the file format matching the image reading device. Accordingly, the server must convert the file stored in the box to the file format matching the type and resolution of the image processing device that receives the file. Accordingly, as the number of types of the file formats of files stored in the box increase, the load of the converting processing of the file format increases, which presents a problem in improving the efficiency of the data processing. Considering this, a system is being investigated in which the server converts the document data received from the image reading device to a rendering format (referred to as "vector data" from now on) independent of the types or resolution of the image reading device, and which stores the vector data in a box. Here, the vector data refers to data that expresses an image in the form of a set of rendering information such as coordinates of points, parameters of equations of lines or surfaces connecting the points, and filling or special effects.

Although the format of the vector data is independent of the resolution of an input image, the amount of the vector data depends on the resolution of the input image. For example, when the input image includes a lot of natural images, the amount of vector data is increased. In such a case, therefore, it take a long time to transfer processing of a file having a high quality bitmap image when transmitting the document data with a vector format stored in the box to another image processing device.

On the other hand, the system disclosed in Japanese Patent Laid-Open No. 2004-178284 employs a method in which the server reduces the amount of document data to be transmitted in accordance with the available space within the data storage area of the image processing device. If the amount of data is reduced, it is feared that the printed image the image processing device outputs may have omissions or that the image quality of the printed image can deteriorate.

SUMMARY OF THE INVENTION

Thus, the present invention provides an image processing system capable of improving the quality of the printed image while increasing the transfer rate of the document data.

In the first aspect of the present invention, there is provided a device configured to transmit, in response to a data transfer request from an image processing device capable of communicating with the device via a communication network, requested data to the image processing device, the device comprising, a unit configured to analyze page description language data, and to generate vector data and metadata from analysis results, a unit configured to store a document file which are recorded by the vector data and the metadata associating, a unit configured to search a requested document file from the stored document file in accordance with a transfer request of the document file received from the image processing device, a editing unit configured to edit the metadata recorded in the document file in accordance with transfer size information received from the image processing device, and to edit the vector data in accordance with the edited metadata, and a unit configured to transmit the edited metadata and vector data to the image processing device.

In the second aspect of the present invention, there is provided an image processing device configured to transmit a data transfer request to a device capable of communicating with it via a communication network and receive requested data, the image processing device comprising, a unit configured to read a document and to generate original image data, a unit configured to input transfer size information, a unit configured to detect information on a device that stores a document file including data about the document from at least part of an area of the original image data, a unit configured to transmit, in accordance with the information detected, a transfer request of the document file and the transfer size information to the device that stores the document file, a unit configured to receive the requested document file the device that stores the document file edits in accordance with the transfer size information, and a unit configured to extract at least part of the original image data in accordance with metadata included in the document file received, and to generate an image that combines the extracted original image data with an image corresponding to the vector data included in the document file received.

In the third aspect of the present invention, there is provided a method of transmitting, in response to a data transfer request from an image processing device capable of communicating via a communication network, requested data to the image processing device, the method comprising the steps of, analyzing page description language data, and generating vector data and metadata from analysis results, storing a document file which are recorded by the vector data and the metadata associating, retrieving a requested document file from the stored document file in accordance with a transfer request of the document file received from the image processing device, editing the metadata recorded in the document file in accordance with transfer size information received from the image processing device, and editing the vector data in accordance with the edited metadata, and transmitting the edited metadata and vector data to the image processing device.

In the fourth aspect of the present invention, there is provided a method of transmitting a data transfer request to a device capable of communicating via a communication network and receiving data requested, the method comprising the steps of, reading a document and generating original image data, inputting transfer size information, detecting information on a device that stores a document file including data about the document from at least part of an area of the original image data, transmitting, in accordance with the information detected, a transfer request of the document file and the transfer size information to the device that stores the document file, receiving the requested document file the device that stores the document file edits in accordance with the transfer size information, and extracting at least part of the original image data in accordance with metadata included in the document file received, and generating an image that combines the extracted original image data with an image corresponding to the vector data included in the document file received.

In the fifth aspect of the present invention, there is provided a device configured to transmit, in response to image quality or rate information received from an image processing device capable of communicating with the device via a communication network, requested data to the image processing device, the device comprising, a unit configured to analyze page description language data, and to generate vector data and metadata from analysis results, a unit configured to store a document file which are recorded by the vector data and the metadata associating, a unit configured to search a requested document file from the stored document file in accordance with the information received from the image processing device, a editing unit configured to edit the metadata recorded in the document file in accordance with the image quality or rate information received from the image processing device, and to edit the vector data in accordance with the edited metadata, and a unit configured to transmit the edited metadata and vector data to the image processing device.

Further features of the present invention will become apparent from the following description of exemplary embodiments (with reference to the attached renderings).

BRIEF DESCRIPTION OF THE RENDERINGS

FIG. 20 is a diagram showing a table referred to when the processing is switched in accordance with color processing; and FIG. 21 is a diagram showing a table referred to when the resolution is switched in accordance with the processing.

DESCRIPTION OF THE EMBODIMENTS

The best mode for carrying out the present invention will now be described with reference to the accompanying renderings.

<Structural Example of MFP>

Figure 1:
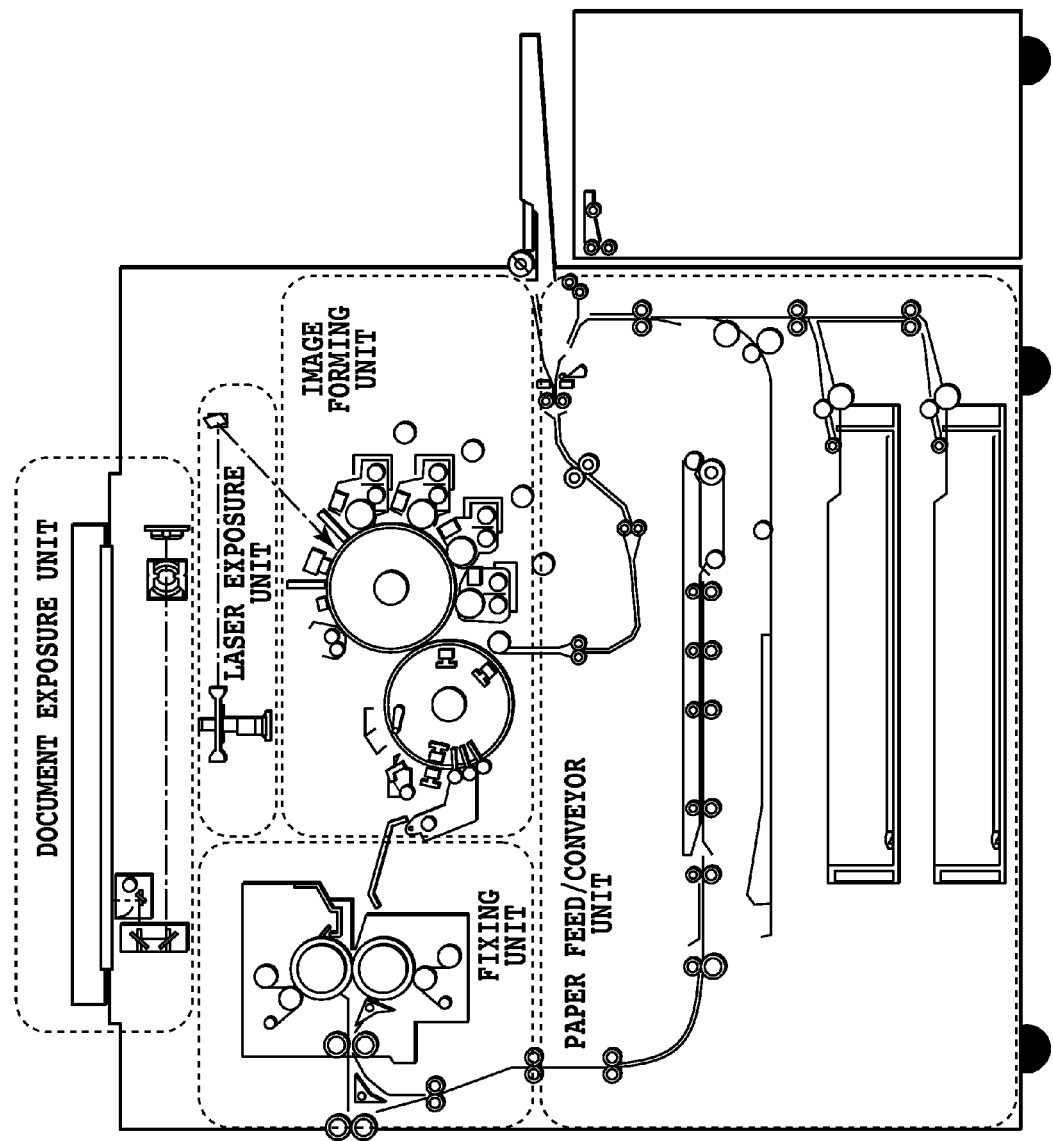
FIG. 1 is a structural example of an MFP suitable for the present embodiment to be applied.

FIG. 1 is a diagram showing a structure of an MFP suitable for the present embodiment to be applied.

A document exposure unit (scanner unit) optically reads an original document placed on a document glass of the scanner unit, and generates image data.

A laser exposure unit emits a laser light, which is modulated in accordance with the image data, onto a polygon mirror rotating at constant angular speed, and causes a photoconductive drum to be irradiated with the reflected light functioning as scanning light, thereby forming a latent image on the photoconductive drum.

An image forming unit carries out an electrophotographic process. The electrophotographic process comprises a series of processes such as driving rotation of the photoconductive drum, charging with a charging unit, developing the latent image with toner, transferring toner images to a sheet, and collecting toner particles left on the photoconductive drum. The development of the latent image with the toner is performed by a developing unit having toners of magenta (M), cyan (C), yellow (Y) and black (K) while the sheet fitted around a prescribed position on a transfer belt is rotated four times. Through the developing process, the toner images of YMCK colors are formed on the photoconductive drum. Then, through the transfer process, the full-color toner images based on the four colors formed on the photoconductive drum are transferred onto the sheet. The sheet, having the toner images transferred thereon, is conveyed to a fixing unit.

The fixing unit includes rollers, a belt and a heater such as a halogen heater, and fixes the toner onto the sheet by melting the toner on the sheet by heat and pressure.

A paper feed/conveyor unit includes at least one sheet storage such as a sheet cassette or paper deck. The paper feed/conveyor unit separates a sheet from a plurality of sheets stacked in the sheet storage in accordance with the instruction from a control unit (not shown) in the image processing device, and conveys it to the image forming unit and fixing unit. The sheet fitted around the prescribed position on the transfer belt of the image forming unit is rotated four times, and is conveyed to the fixing unit thereafter. While the sheet is rotated four times, the toner images of the YMCK colors are transferred onto the sheet. In the case of forming images on both sides of the sheet, the sheet passing through the fixing unit is conveyed to the image forming unit again through the conveyance path.

A control unit controls the operation of the scanner, laser exposure unit, image forming unit, fixing unit, paper feed/conveyor unit and so on.

<Example of System Configuration>

Figure 3:
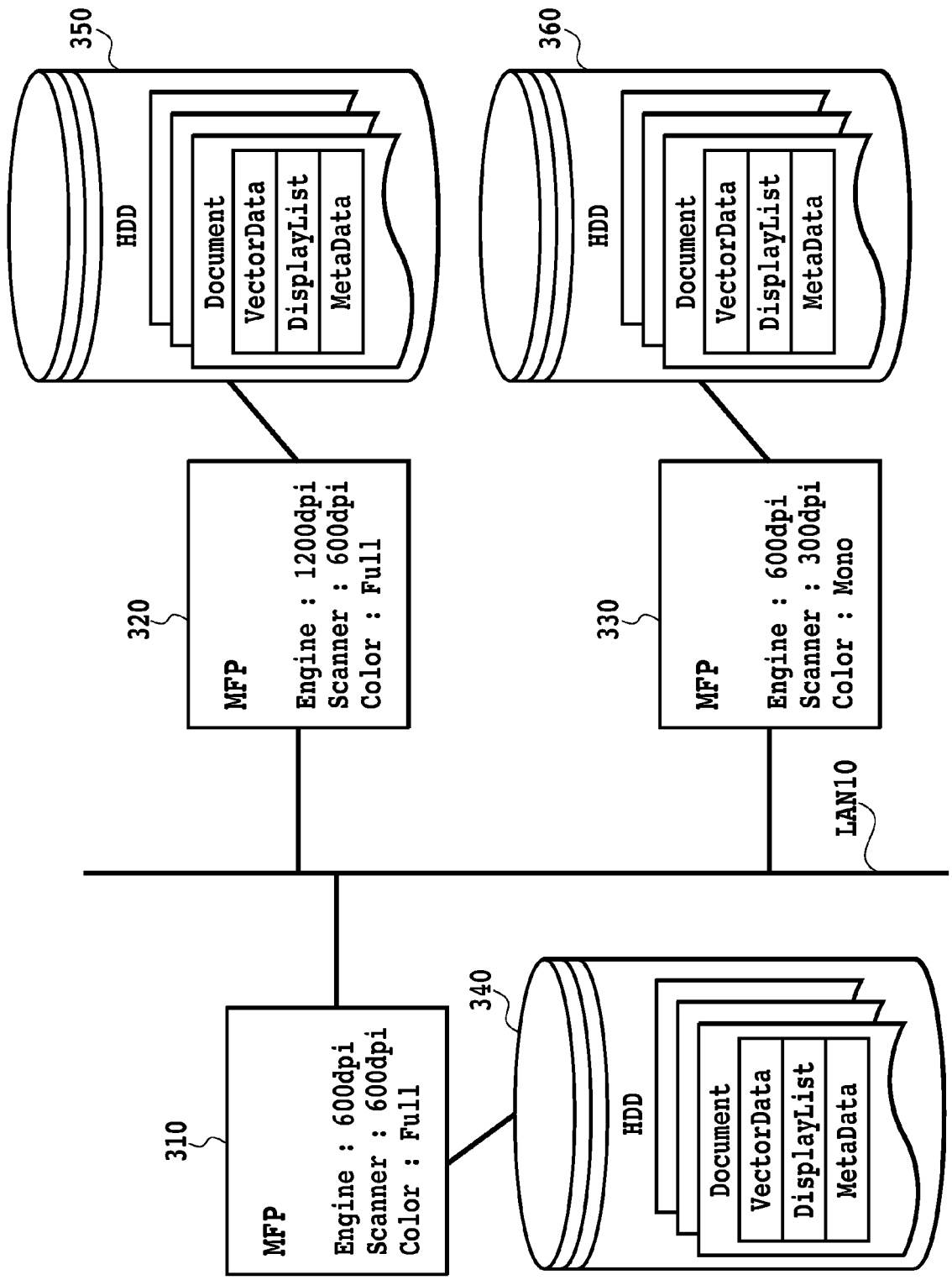
FIG. 3 is a block diagram showing a configuration of an image processing system in the present embodiment.

FIG. 3 is a block diagram showing a configuration of the image processing system in the present embodiment.

In FIG. 3, the image processing system is included in a communication network such as a LAN (Local Area Network) 10, and an MFP 310, an MFP 320 and an MFP 330 capable of communicating with each other via the communication network. Each MFP carries out data communication with another MFP via the LAN.

The MFPs have HDDs (Hard Disk Drives) 340, 350 and 360 as a storage device, respectively.

The resolution of the MFPs differs from MFP to MFP. The term "resolution" refers to a value expressing the definition of printing of a printer. In the printer, the resolution is expressed in terms of the number of dots that can be printed in a width of one inch (the unit is dpi). As the resolution increases, a higher-definition text or image can be reproduced. In addition, as for the scanner, its performance indicating the level to which extent it can read an image precisely is also expressed in terms of resolution of dpi. It is assumed here that printers of the MFP 310 and MFP 330 have the resolution of 600 dpi, and the printer of the MFP 320 has the resolution of 1200 dpi. As for the resolution of the scanners mounted on the MFPs, they also differ from MFP to MFP. It is assumed here that the scanners of the MFP 310 and MFP 320 have the resolution of 600 dpi, and the scanner of the MFP 330 has the resolution of 300 dpi. As for the processing capacity of the printers, it also varies from MFP to MFP. It is assumed here that the MFP 310 and MFP 320 are a color printing compatible device (Color: Full) and the MFP 320 is a monochrome printing compatible device (Color: Mono).

In addition, each MFP includes a rasterizer. The rasterizer is hardware or software for expressing a text or image a computer handles in terms of a collection of colored small dots (bitmap data) so that the printer can print. The computer stores within it a font (text) or an image to be printed and rendering information such as coordinates of dots, parameters of equations of lines or surfaces connecting them and filling in a vector format. In contrast, since the printer handles the image as a collection having colored dots (pixels) arranged in rows and columns, it cannot print the rendering information (vector data) in the vector format as it is. Accordingly, the rendering information in vector format must be converted to bitmap data with a raster format. Such conversion from vector data to bitmap data is referred to as rasterization.

When printing with the MFP which includes a function of printing data of one page in its entirety, the computer generates PDL data (page description language data), and transmits the PDL data it generates to the MFP via the network. The MFP converts the PDL data to vector data, and further converts the vector data to a display list (DL). More specifically, the MFP generates the vector data by analyzing the rendering commands (PDL data) associated with the text, graphics and the like, first. In addition, as for the generated vector data, the MFP approximates its curved portions represented in Bezier or spline curves by minute straight lines, thereby converting them to polygonal vector data (short vectors). The vector data thus generated constitutes a data set referred to as a display list. The PDL data is a page description language for specifying the layout of the text and figures of the target page to be printed. The display list is intermediate code generated in a process of converting the vector data to the bitmap data. The display list describes rendering commands. The foregoing rasterizer converts the display list to the bitmap data.

As for the functions of the MFP 310-MFP 330 and the number of the MFPs, they are not limited to those shown in FIG. 3. In addition, it is also possible to connect to a LAN 10 any information processing devices other than the MFPs such as a computer.

<Example of Configuration of Controller Unit>

Figure 2:
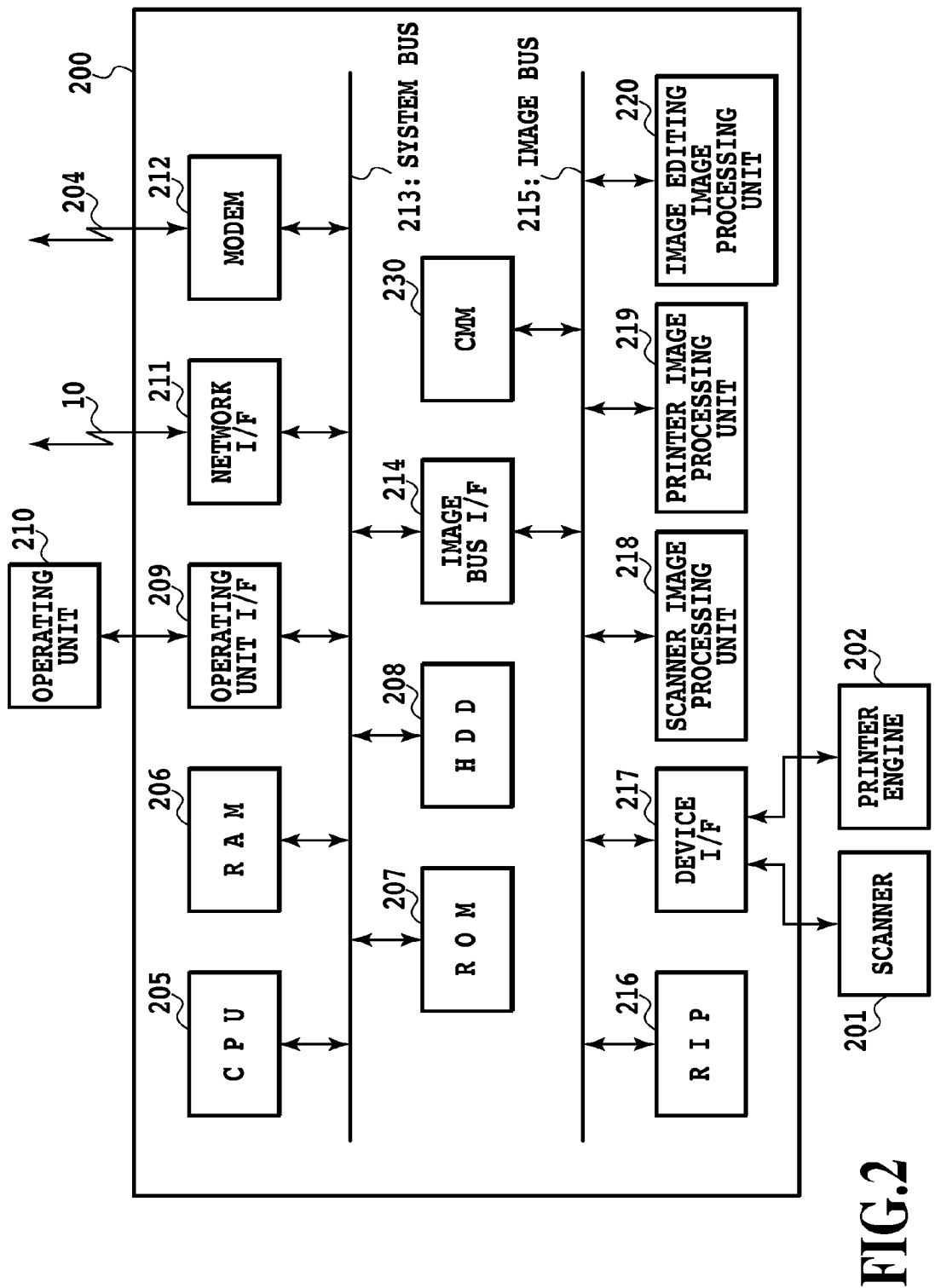
FIG. 2 is a block diagram showing a configuration of a control unit of the MFP in the present embodiment.

FIG. 2 is a block diagram showing a configuration of the control unit of the MFP in the present embodiment.

The control unit 200 is connected to a scanner 201, a printer engine 202 and an operating unit 210, and carries out image data reading control, image processing, printout control, printing setting and so on using an internal CPU. In addition, the control unit 200 performs input/output control of image information or device information to and from an external device (information processing device such as another MFP or computer).

The control unit 200 includes a system bus 213 and an image bus 215 for transferring image data at high speeds, and various components are connected to the buses. The system bus 213 and the image bus 215 are connected via an image bus I/F 214. The image bus I/F 214 is an interface for connecting the system bus 213 with the image bus 215.

A CPU 205, a RAM 206, a ROM 207, an HDD 208, an operating unit I/F 209, a network I/F 211, and a modem 212 are connected to the system bus 213.

The CPU 205 operates in accordance with controller software which will be described later. The RAM 206, which is a system work memory the CPU 205 uses, is also an image memory for temporarily storing input image data. The ROM 207 is a boot ROM that stores a boot program of the system. The HDD 208 is a hard disk drive that stores controller software for varieties of processing and the input image data. The operating unit I/F 209 outputs operating screen data to the operating unit 210 for exhibiting the operating screen to a user. In addition, the operating unit I/F 209 supplies the CPU 205 with instructions the user inputs via the operating unit 210. The network I/F 211, which is a LAN card or the like for connecting the control unit 200 to the LAN 10, conducts transmission and reception of the data between it and external devices. The modem 212, which is a device for connecting the control unit 200 to a public network 204, performs transmission and reception of the data between it and the external devices.

A raster image processor (RIP) 216, a device I/F 217, a scanner image processing unit 218, a printer image processing unit 219, an image editing image processing unit 220, and a color management module (CMM) 230 are connected to the image bus 215.

The raster image processor 216 converts the PDL or vector data to bitmap data. The device I/F 217 connects the scanner 201 or printer engine 202 to the control unit 200, and performs synchronous/asynchronous conversion of the image data.

The scanner image processing unit 218 performs various processing such as correction, processing and editing on the image data input from the scanner 201. The printer image processing unit 219 performs, on the image data to be printed out, processing such as correction and resolution conversion in compliance with the printer engine 202. The image editing image processing unit 220 performs various image processing such as rotation of the image data and compression/decompression processing of the image data. The color management module 230 performs color converting processing (or color space converting processing) on the image data in accordance with profile or calibration data. The profile is a function for converting color image data expressed in the color space dependent on the device to that in the color space independent of the device (such as Lab). The calibration data is data for correcting color reproducibility of the scanner 201 and printer engine 202.

<Configuration Example of Controller Software>

Figure 4:
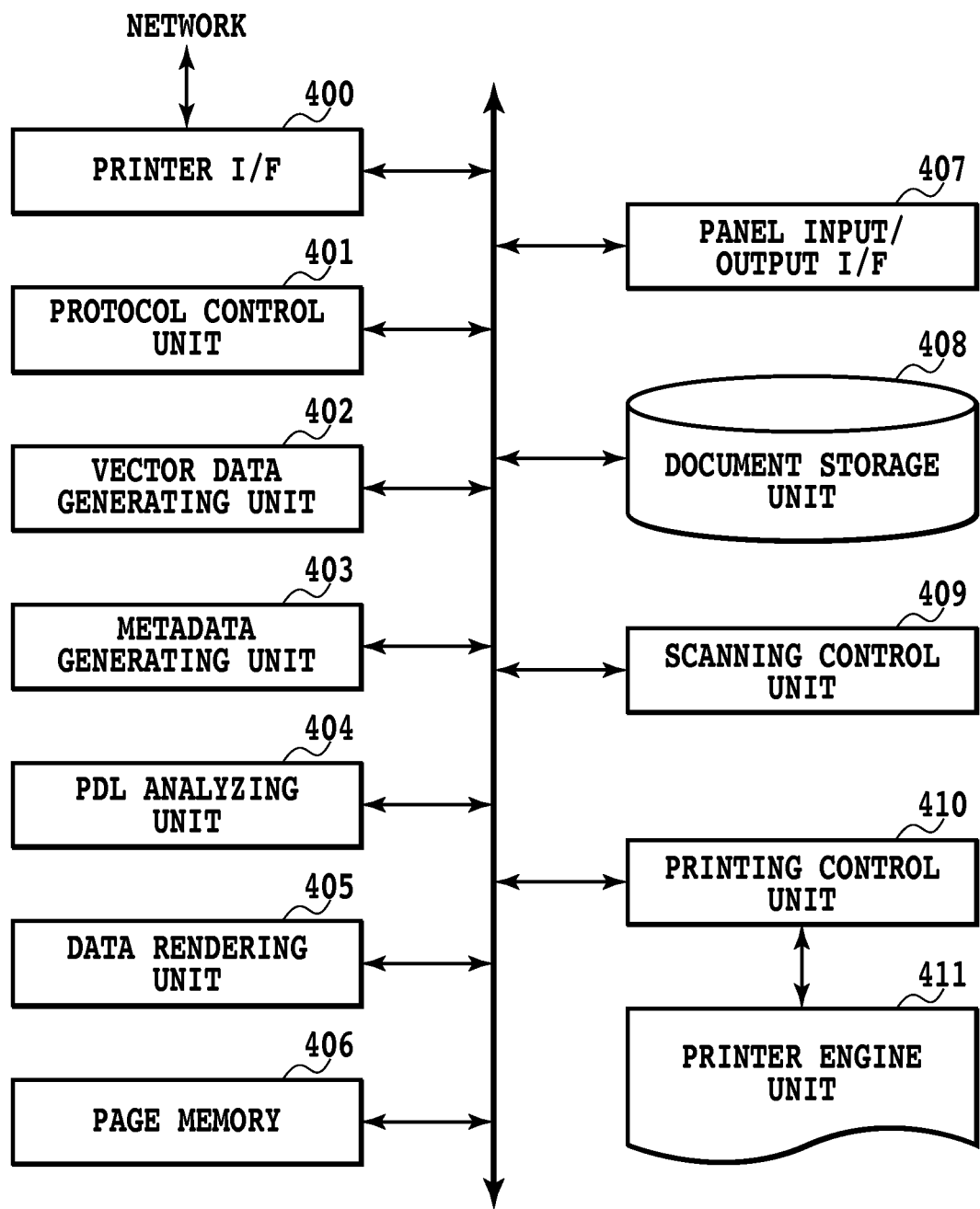
FIG. 4 is a block diagram showing a configuration of controller software for controlling the operation of the MFP.

FIG. 4 is a block diagram showing a configuration of the controller software for controlling the operation of the MFP.

A printer interface 400 conducts transmission and reception of data between it and the external devices via the network. A protocol control unit 401 controls data communication in accordance with a prescribed network protocol.

A vector data generating unit 402 carries out (vectorizing) processing of converting the bitmap data to vector data which is rendering description independent of the resolution. A metadata generating unit 403 generates secondary information obtained in the vectorizing process as metadata. The metadata is additional data for image retrieval.

A PDL analyzing unit 404 analyzes the PDL and converts it to a display list. A data rendering unit 405 converts the display list it receives from the PDL analyzing unit 404 to the bitmap data. A page memory 406 stores the bitmap data. A panel input/output I/F unit 407 controls the operating unit 210.

A document storage unit 408 stores, for each job, a data file including the vector data, display list and metadata. In the following description, the data file is referred to as "document file" (Document).

A scanning control unit 409 performs various processes such as correction, processing and editing on the image data input from the scanner 201. A printing control unit 410 converts the bitmap data stored in the page memory 406 to an image signal, and outputs it to a printer engine unit 411. The printer engine unit 411 generates an image to be printed on recording paper in accordance with the image signal received.

<Generating Processing of Document File>

The generating processing of the document file in PDL printing will be described with reference to the renderings.

The term "PDL printing" refers to the operation in which the MFP receives the PDL data a printer driver loaded on the computer generates via the network, and prints out after performing prescribed image processing.

Figure 9:
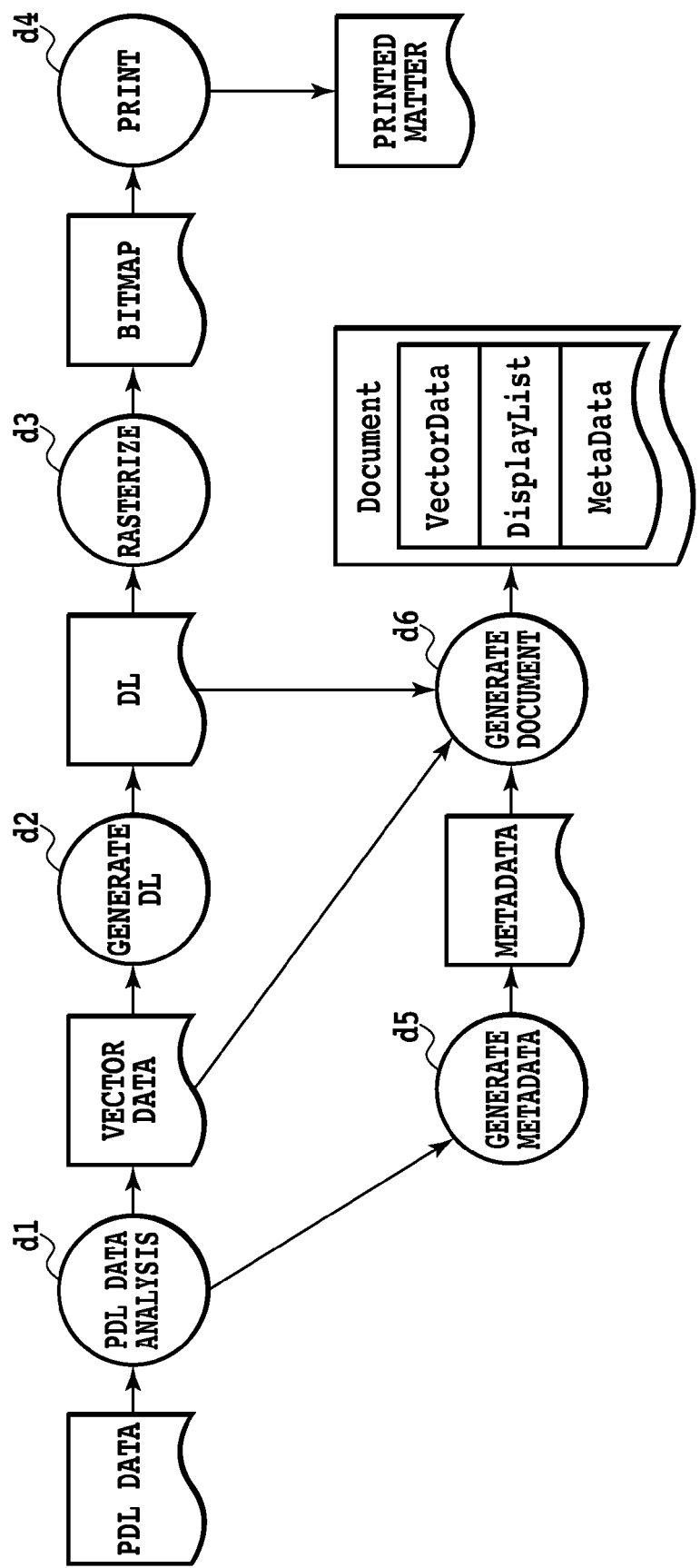
FIG. 9 is a data flowchart showing the generating processing of a document file consisting of vector data, display list and metadata in PDL printing.

FIG. 9 is a data flowchart showing a flow of the generating processing of the document file in the PDL printing. It is assumed in the following description that the processing is executed by the control unit 200.

In PDL data analyzing processing d1, the control unit 200 analyzes the PDL data received from the computer via the network, and generates the vector data in accordance with the analysis result.

In display list generating processing d2, the control unit 200 converts the vector data to the display list.

In metadata generating processing d5, the control unit 200 generates the metadata in accordance with the analysis result by the PDL data analyzing processing d1. The processing will be described later.

In document file generating processing d6, the control unit 200 generates the document file by combining the vector data, display list and metadata. The data structure of the document file will be described later.

In rasterizing processing d3, the control unit 200 converts the display list to the bitmap data.

In printing processing d4, the control unit 200 prints the bitmap data on recording paper.

Figure 8:
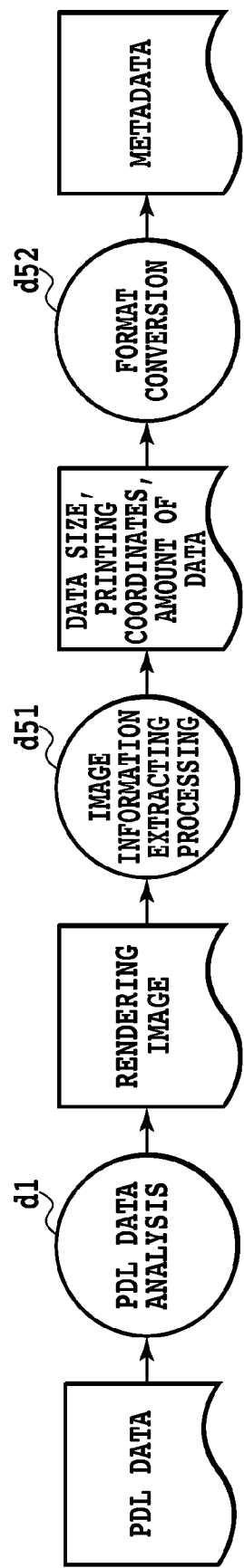
FIG. 8 is a diagram showing details of metadata generating processing d5.

FIG. 8 is a data flowchart showing a flow of the metadata generating processing d5.

In the PDL data analyzing processing d1, the control unit 200 analyzes the PDL data and generates a rendering image (bitmap data), that is, an object (bitmap image object) having the attributes of the bitmap image.

In image information extracting processing d51, the control unit 200 extracts the image additional information including the data size (width and height), printing coordinates and amount of data of the rendering image and so on.

In format converting processing d52, the control unit 200 converts the image additional information to metadata. The term "metadata" refers to the additional data for image retrieval.

<Example of Data Structure of Document File>

Next, an example of the data structure of the document file will be described with reference to the renderings.

Figure 6:
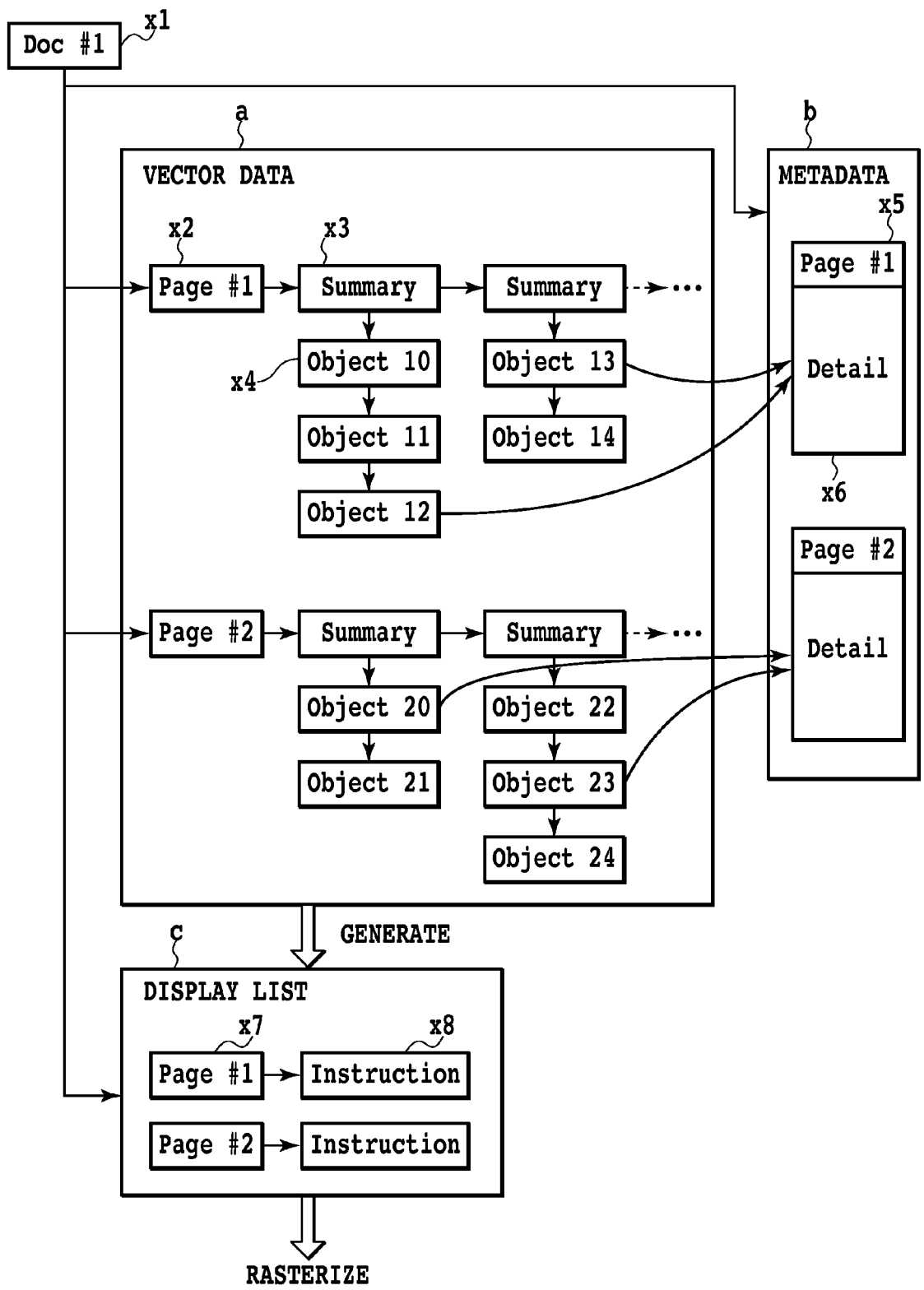
FIG. 6 is a diagram showing an example of a data structure of the document file.

FIG. 6 is a diagram showing an example of the data structure of the document file.

The document file includes data on a plurality of pages, and is expressed in a hierarchical structure having a document header (x1) as a root. The document file has vector data (a), metadata (b) and display list (c).

The vector data (a) has page headers (x2), summary information (x3) and objects (x4). The metadata (b) has page information (x5) and detailed information (x6). The display list (c) has page headers (x7) and instructions (x8) for rendering development. The instructions (x8) comprise rendering information, depending on the resolution.

The document header (x1) describes a storage area of the vector data (a) and a storage area of the display list (c), and the vector data (a) and display list (c) are associated by the document header (x1).

The vector data (a) is the rendering information independent of the resolution. The page header (x2) describes page layout information such as size and direction of the page. The object (x4) describes the rendering information such as lines, polygons and Bezier curves. In addition, the plurality of objects (x4) is associated with the summary information (x3). The summary information (x3) describes the attribute information of the plurality of objects associated.

The metadata (b) is the additional data for the image retrieval. The page information (x5) describes the number of pieces of information recorded in the PageID and metadata, for example. The detailed information (x6) describes the data size (width and height), printing coordinates and amount of data of the rendering image.

Since the summary information (x3) on the vector data (a) is associated with the metadata (b), the summary information (x3) can refer to the detailed information (x6) within the metadata (b).

The display list (c) is intermediate code generated during the converting process of the vector data (a) to the bitmap data. The page header (x7) describes a management table for managing the instructions (x8).

Figure 10:
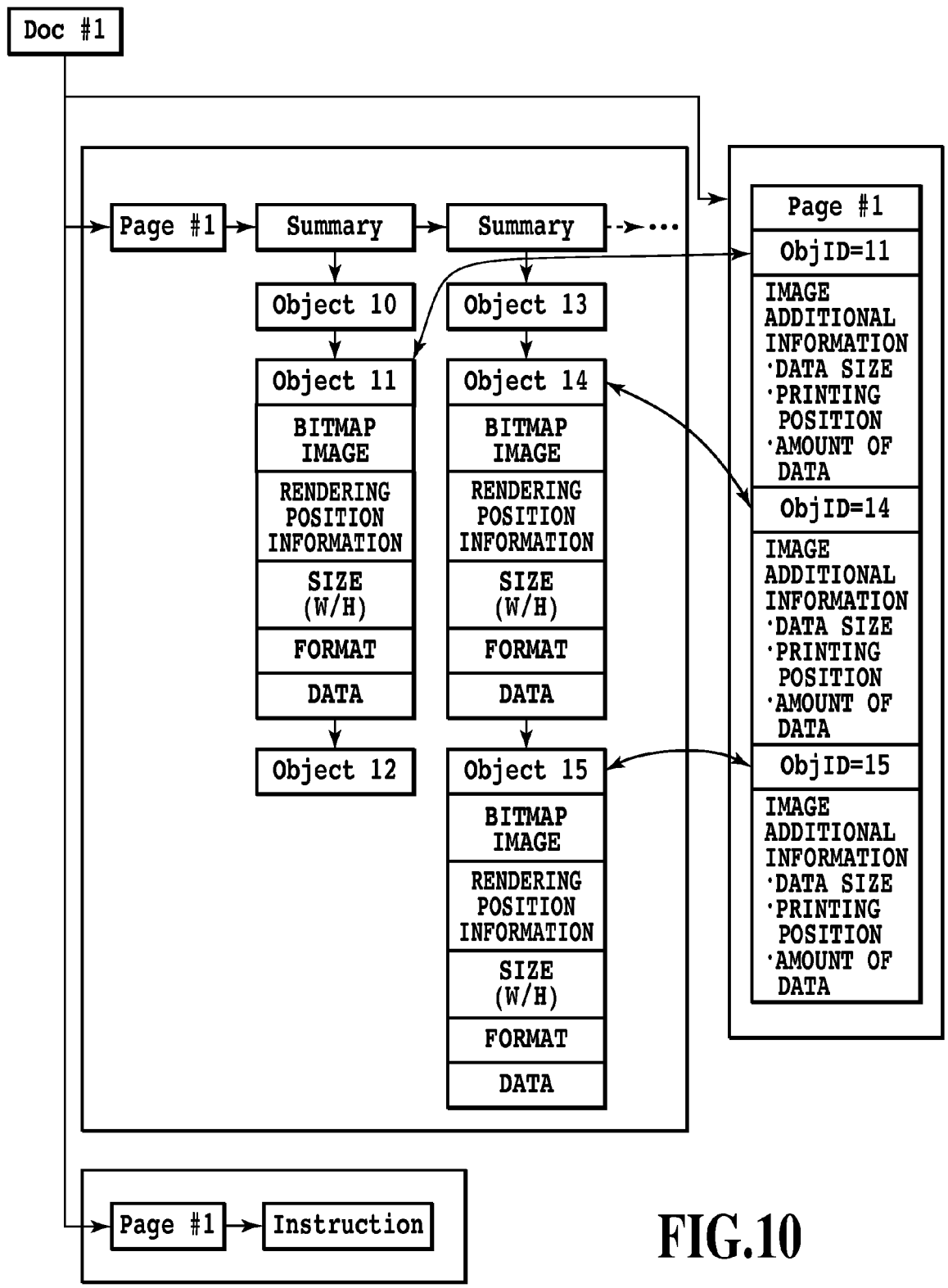
FIG. 10 is a diagram showing a concrete example of the data structure of the document file shown in FIG. 6.

FIG. 10 is a diagram showing a concrete example of the data structure of the document file shown in FIG. 6.

A first page (Page #1) includes three types of objects (11, 14 and 15) of the rendering image. Each object includes information (rendering position information, size, format and data) necessary for processing each rendering image. On the other hand, in the metadata, the object IDs (11, 14 and 15) are associated with the image additional information (data size (width and height), printing position and amount of data).

Figure 7:
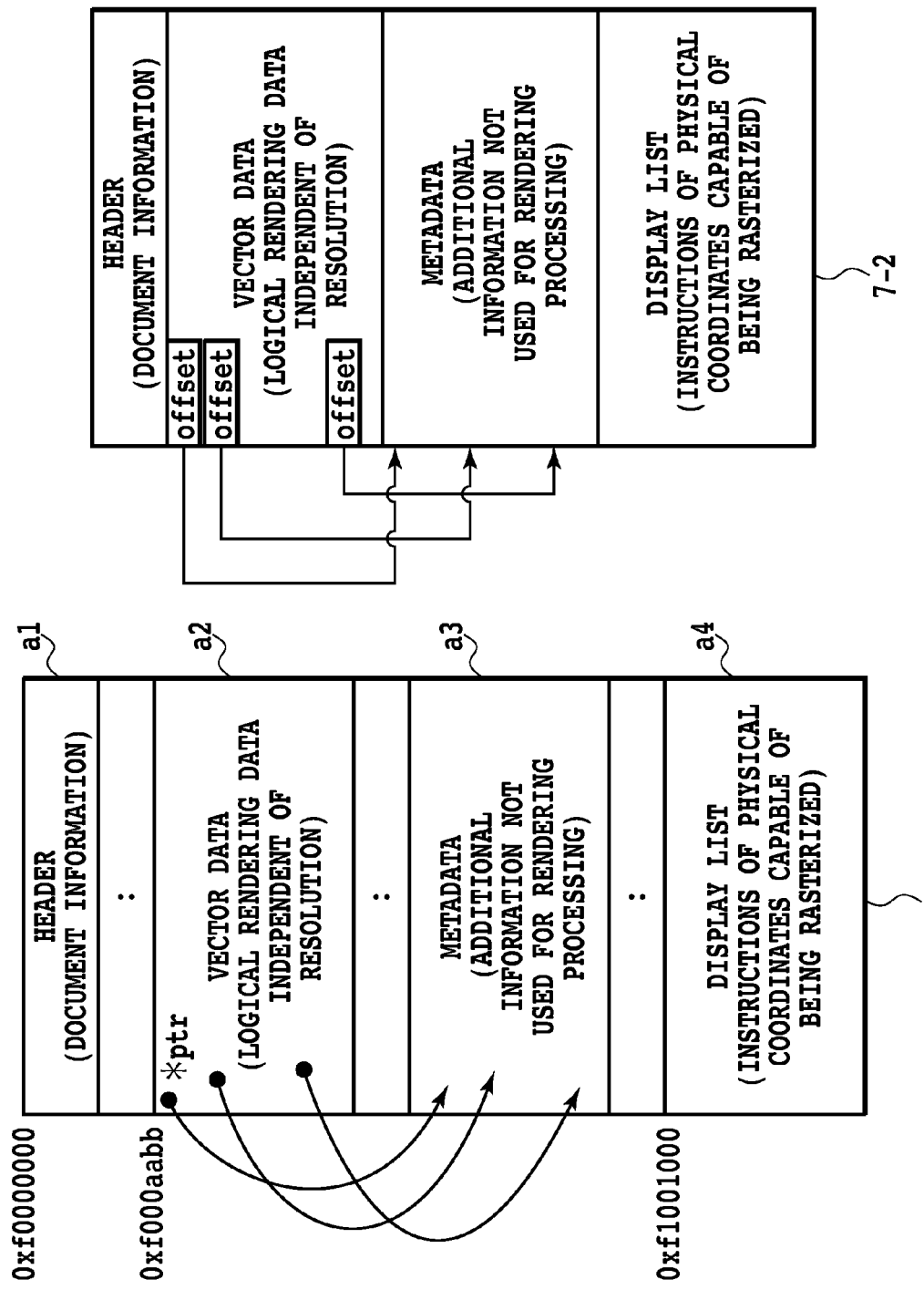
FIG. 7 is a diagram showing a storage area of a storage unit that stores various data shown in FIG. 6.

FIG. 7 is a diagram showing a storage area of the storage unit, in which the various data shown in FIG. 6 are stored.

The reference numeral 7-1 designates a state in which the foregoing data are arranged on the memory. The header (x1), vector data (a), metadata (b) and display list (c) of the document file are stored in the header area (a1), vector data area (a2), metadata area (a3) and display list area (a4) in the memory, respectively.

The reference numeral 7-2 designates a state in which the various data are arranged in the file. The vector data, metadata and display list of the document file are located in the continuous vector data area, metadata area and display list area.

<Example of Original Document Printing Processing>

Next, an example of the original document printing processing in the present embodiment will be described.

In the original document printing processing, the MFP 320 transmits a data transfer request of the original document to the MFP 310 first in accordance with the original document information provided to the document image read out. Then, in response to the data transfer request, the MFP 310 transfers the original document to the MFP 320. Thus, the MFP 320 prints the original document it receives. The MFP 310 stores the original document in advance. The original document information includes device information on the MFP that stores the original document, address information on the MFP, an original document management number and so on.

The original document information is printed on the document in the form of a two-dimensional code, for example. Since the processing uses the original document, it can obtain higher quality printout than when printing the image the scanner reads.

In the following description, the MFP 320 on the side of executing the document printing processing is called a printing executing device (second device), and the MFP 310 on the side of storing the original document is called a document storage device (first device).

Figure 13:
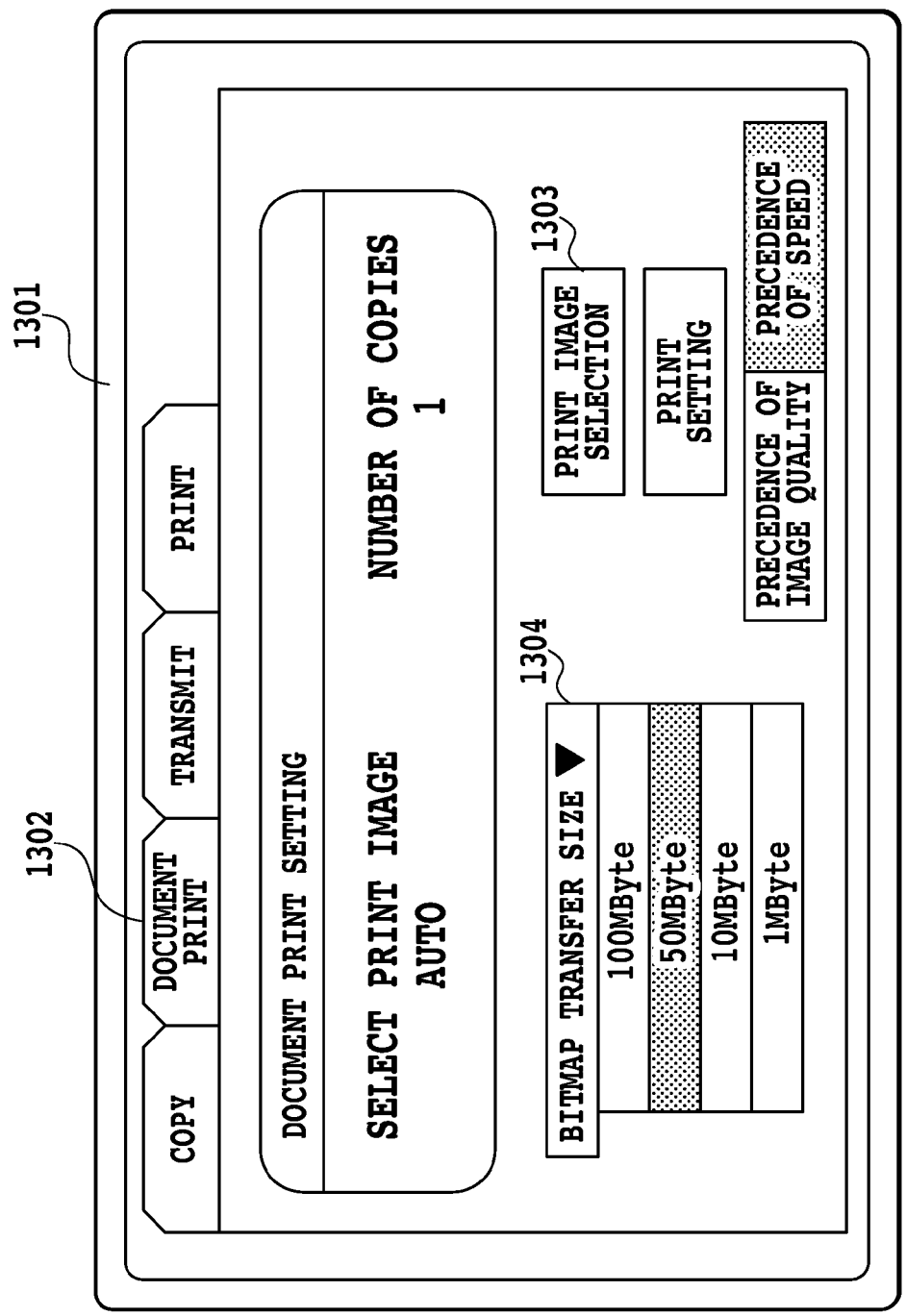
FIG. 13 is a diagram showing an example of an operating screen displayed on an operating unit of a printing executing device.

FIG. 13 is a diagram showing an example of the operating screen displayed on the operating unit of the printing executing device.

The operating unit displays a touch-panel type operating screen. A user touches various buttons displayed on the touch panel to instruct to set the original document printing or to start executing the original document printing.

When the user touches an original document printing button 1302, the operating screen 1301 displays the print image select button 1303, bitmap data transfer size select button 1304 and the like.

The print image select button 1303 is a button for setting a color mode. When the user touches the color mode setting button 1303, a color mode list such as "color print", "monochrome print" and "AUTO" is displayed. The user selects a desired color mode from the color mode list displayed. When the user selects the "color print" mode or "monochrome print" mode, the printout is carried out in the color mode selected. On the other hand, when the user selects the "AUTO" mode, regardless of whether the original document scanned is colored or monochrome, the color print is performed when the original document is colored, and the monochrome print is performed when it is monochrome.

When the user touches the bitmap data transfer size select button 1304, a size list for designating the transfer size information (capacity) of the object contained in the original document is displayed. The user selects desired transfer size information from the transfer size information recorded in the size list in advance. In the example, any one of one megabytes, 10 megabytes, 50 megabytes and 100 megabytes can be set as the transfer size information. A configuration is also possible which enables input of any desired transfer size information by manipulating a numeric keypad (not shown) instead of operating the touch panel. It may be conceivable that the transfer size information is difficult for the operator to understand. Thus, a user interface can be employed which divides into two levels of high speed and high quality rather than the four levels, and further divides between them into two levels to obtain the total of four levels so that the user can select the desired level from the four levels. In this case also, the device executes the processing within it in the same manner as when one megabytes of the bitmap transfer size 1304 is selected when the high speed is selected, and 100 megabytes is selected when the high quality is selected.

Next, the process of generating and printing the original document in the present embodiment will be described.

Figure 14:
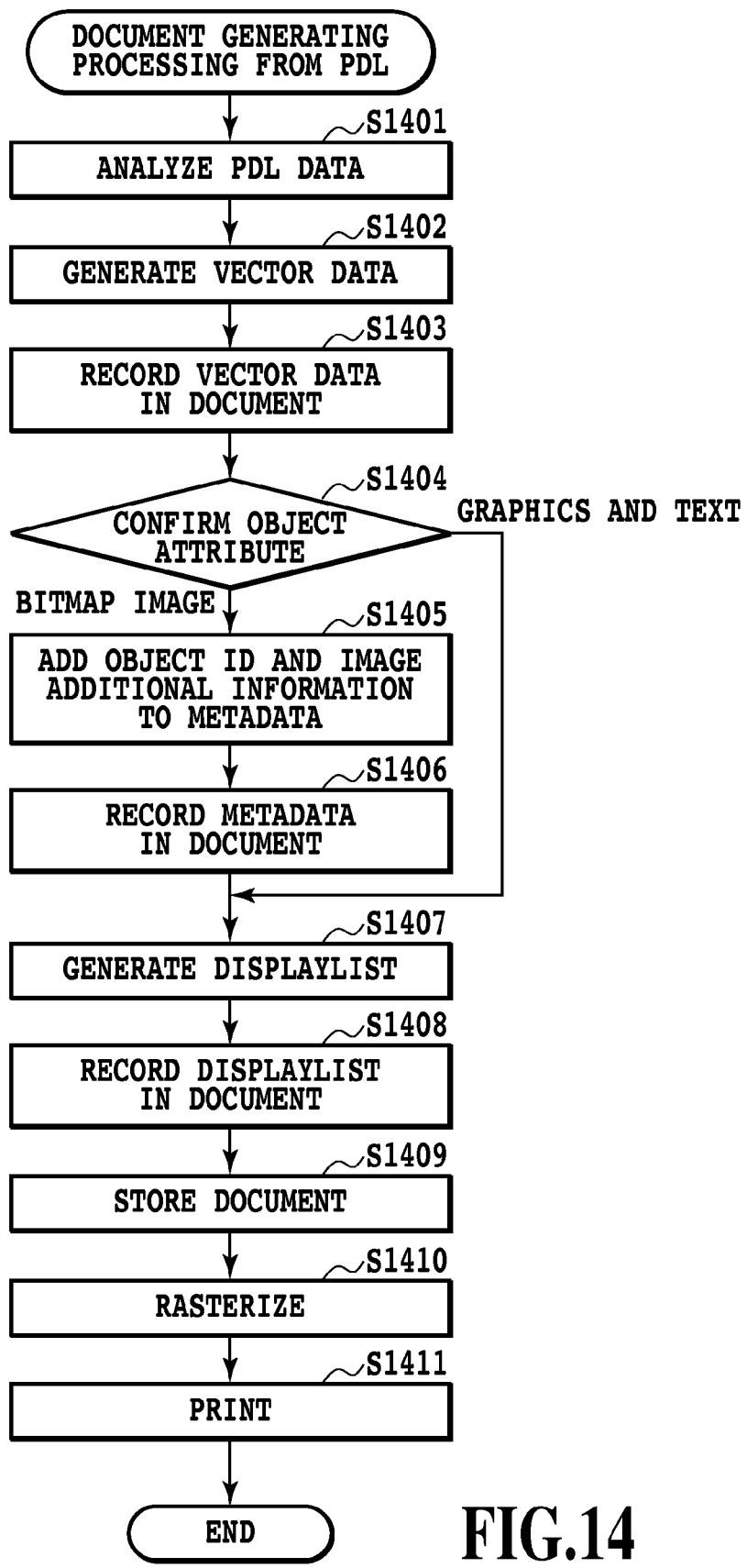
FIG. 14 is a flowchart showing a flow of the processing of a document storage device at the time of generating and printing out an original document file.

FIG. 14 is a flowchart showing a flow of the processing.

The processing is executed by the control unit 200 of the document storage device.

Figure 5:
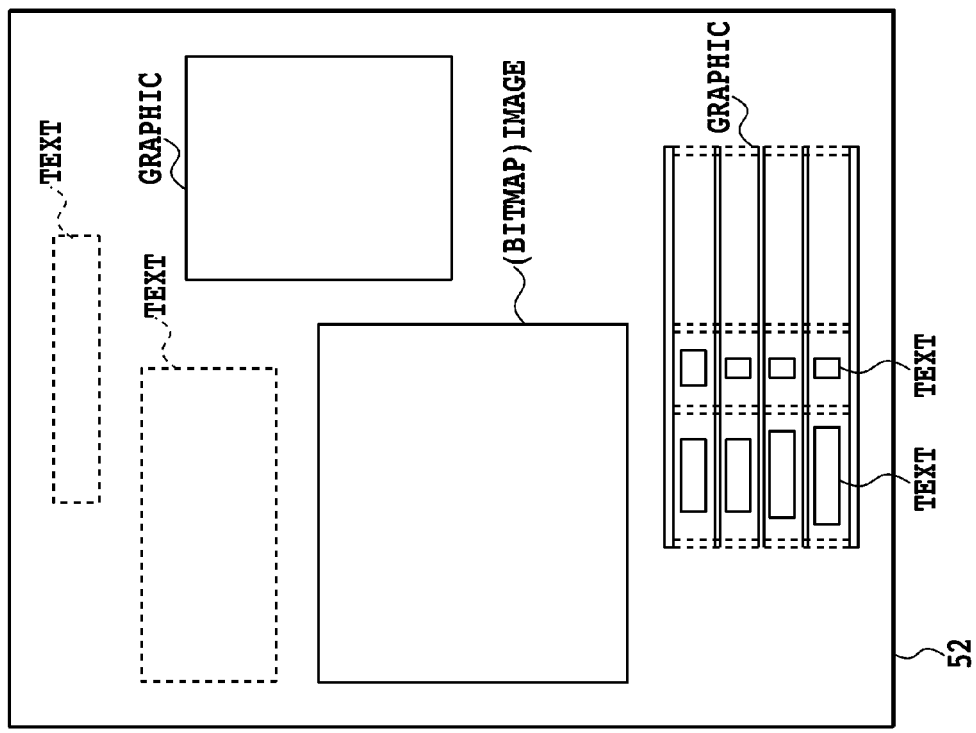
FIG. 5 is a diagram showing a result after carrying out printing processing based on PDL data, and an attribute classification result obtained by analyzing the PDL data.
Figure 5:
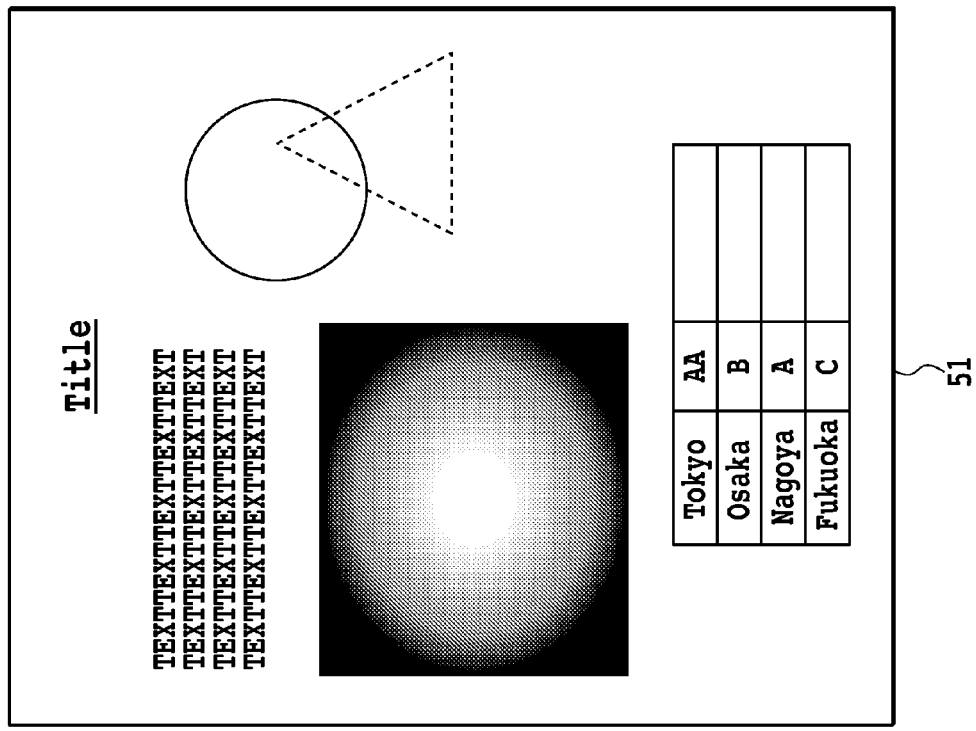

At step S1401, the document storage device analyzes the PDL data which is the original document, and classifies the objects contained in the PDL data in accordance with the attributes (text, graphics and bitmap image). FIG. 5 shows a printing result 51 after executing printing processing in accordance with the PDL data, and an attribute classification result 52 obtained by analyzing the PDL data. In the attribute classification result 52, portions enclosed by broken lines represent each unit of the objects, to which the attribute is assigned.

At step S1402, the document storage device generates the vector data in accordance with the attribute classification result 52.

At step S1403, the document storage device records the vector data generated in the document file.

At step S1404, if the attribute of the object is a bitmap image, the document storage device proceeds to the processing at step S1405, and unless the type of the object is a bitmap image, it proceeds to the processing at step S1407.

If the attribute of the object is a bitmap image, the document storage device generates the metadata including the object ID and image additional information at step S1405. The image additional information is information on the data size (width and height), printing position and amount of data of the objects.

At step S1406, the document storage device records the metadata generated in the document file.

At step S1407, the document storage device generates the display list from the vector data generated at step S1402.

At step S1408, the document storage device records the display list generated in the document file.

At step S1409, the document storage device stores the document file recording the vector data, metadata and display list in the storage device.

At step S1410, the document storage device generates the bitmap data by rasterizing the display list recorded in the document file.

At step S1411, the document storage device carries out printing by using the bitmap data generated.

The foregoing processing creates the source document on which the original document is printed together with the original document information.

Next, the original document printing processing in the present embodiment will be described.

Figure 15:
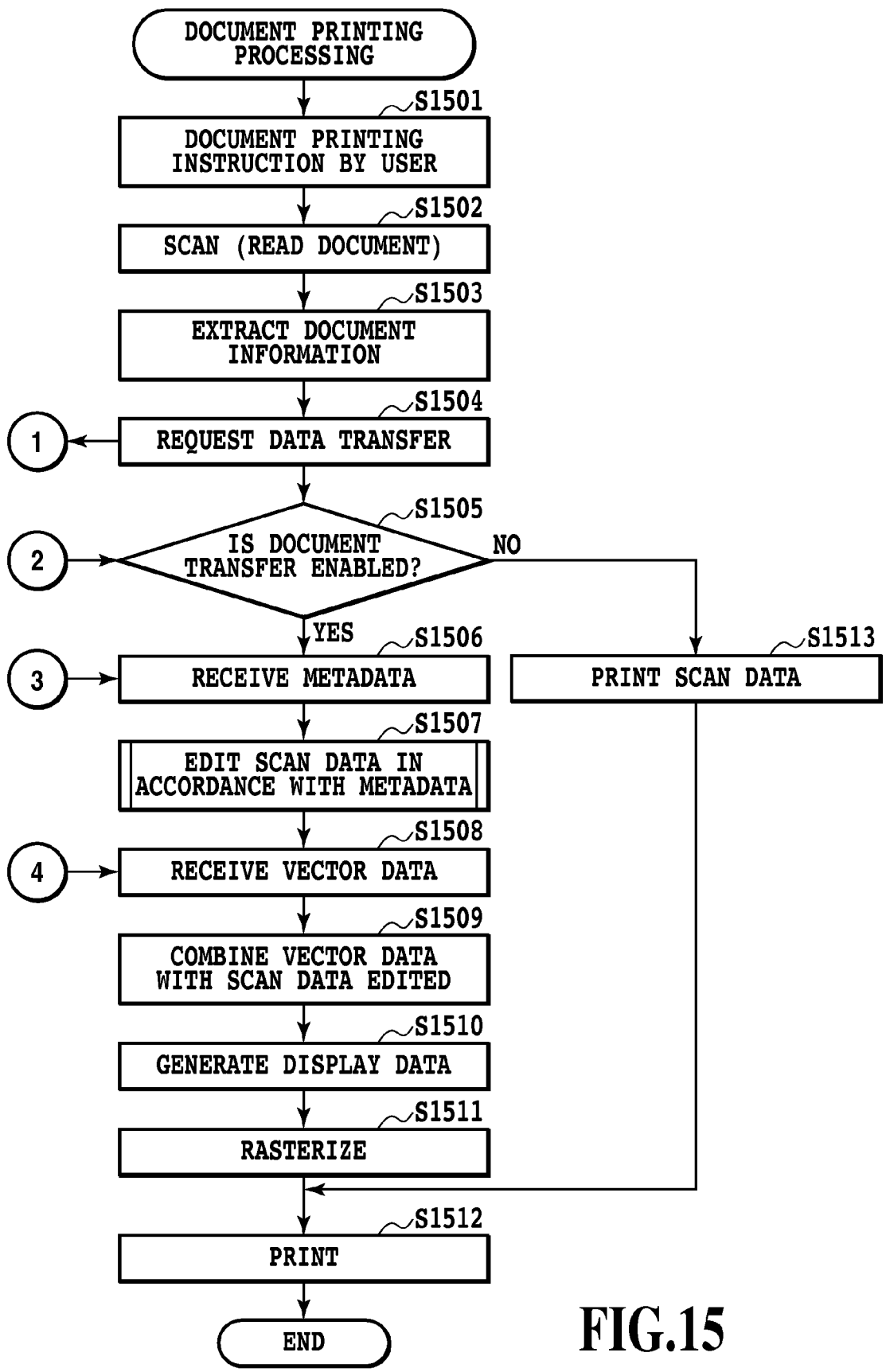
FIG. 15 is a flowchart showing a flow of the processing in the printing executing device at the time of executing the document printing.

FIG. 15 is a flowchart showing a flow of the processing.

The processing is executed by the control unit 200 of the printing executing device.

At step S1501, the user sets the document on which the original document is printed on the scanner 201 of the printing executing device, and instructs to start the original document printing from the operating unit 210. More specifically, the user carries out various settings for the original document printing via the operating screen shown in FIG. 13, and then instructs to print the original document by pushing a copy start button (not shown).

At step S1502, the scanner 201 of the printing executing device scans the document, and supplies the control unit 200 with the original image data of the document scanned.

At step S1503, the printing executing device extracts the original document information contained in the original image data using a publicly known technique. The original document information refers to the device information, device address, original document management number and the like of the document storage device that stores the original document. It is assumed that the original document information is printed in advance in the form of a two-dimensional code or the like on the document to be scanned.

At step S1504, according to the original document information it has extracted, the printing executing device transmits a data transfer request of the original document to the document storage device that stores the original document. In addition to transmitting the data transfer request of the document, the printing executing device transmits to the document storage device the transfer size information on the bitmap data designated via the operating screen shown in FIG. 13, and the function information on the printing executing device.

At step S1505, the printing executing device receives a response message to the data transfer request of the original document, that is, a document transfer enabled message or document transfer disabled message (see FIG. 17) is sent from the document storage device. According to the message, the printing executing device determines as to whether the original document can be transferred from the document storage device or not. Unless it determines that the original document can be transferred, the printing executing device proceeds to the processing at step S1513 to execute ordinary copying. In contrast, if it determines that the original document can be transferred, the printing executing device proceeds to the processing at step S1506.

Figure 17:
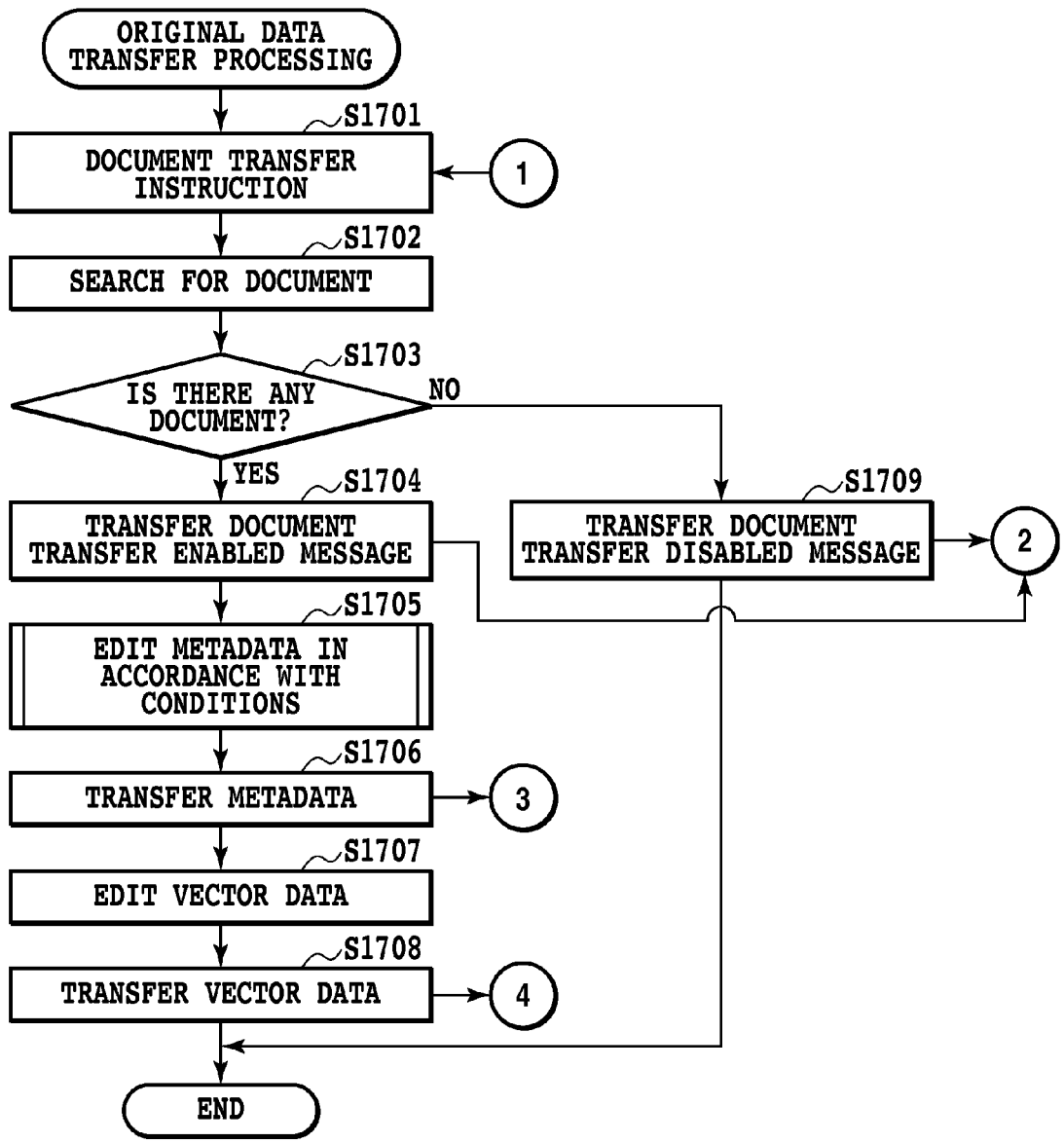
FIG. 17 is a flowchart showing a flow of the transfer processing of the original document data the document storage device executes.

At step S1506, the printing executing device receives the metadata the document storage device transmits in the processing at step S1706 of FIG. 17.

At step S1507, in accordance with the metadata it receives from the document storage device, the printing executing device executes the editing processing of the scan data. The details of the editing processing of the scan data will be described later.

At step S1508, the printing executing device receives the vector data the document storage device transmits in the processing at step S1708 of FIG. 17.

At step S1509, the printing executing device performs combining processing of the scan data edited with the vector data.

At step S1510, according to the vector data, the printing executing device generates the display list.

At step S1511, the printing executing device rasterizes the display list to generate the bitmap data.

At step S1512, the printing executing device prints the bitmap data on a paper medium, and completes the document printing processing.

Next, the editing processing (step S1507) of the scan data will be described.

Figure 16:
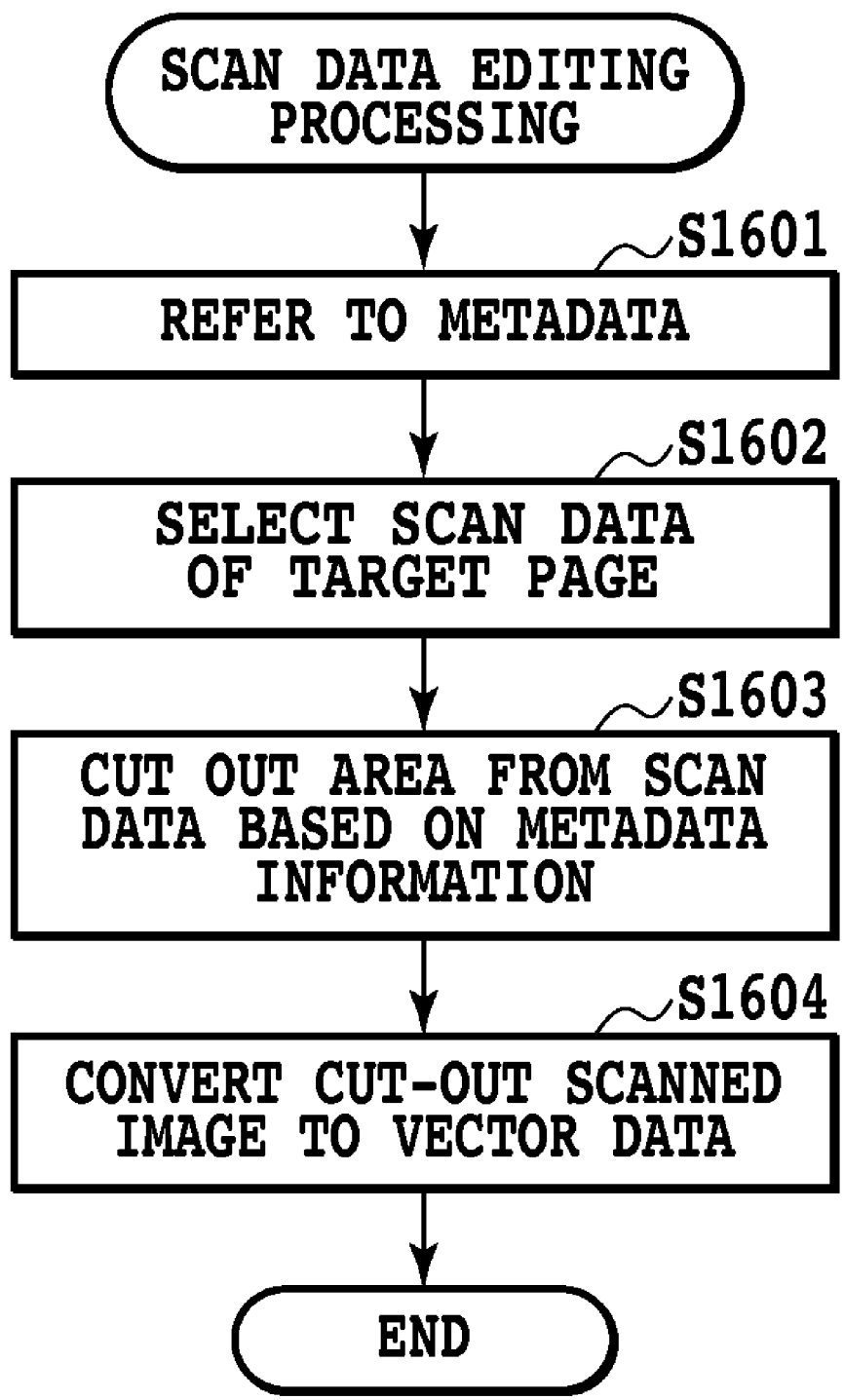
FIG. 16 is a flowchart showing a flow of the editing processing (step S1507) of the scan data.

FIG. 16 is a flowchart showing a flow of the processing.

At step S1601, the printing executing device refers to the information (PageID and image additional information) contained in the metadata.

At step S1602, the printing executing device selects the scan data on the page corresponding to the PageID.

At step S1603, according to the maintained image additional information contained in the metadata it refers to, the printing executing device extracts part of the scan data selected.

At step S1604, the printing executing device converts part of the scan data it extracts to the vector data, and thus completes the editing processing of the scan data.

Figure 12:
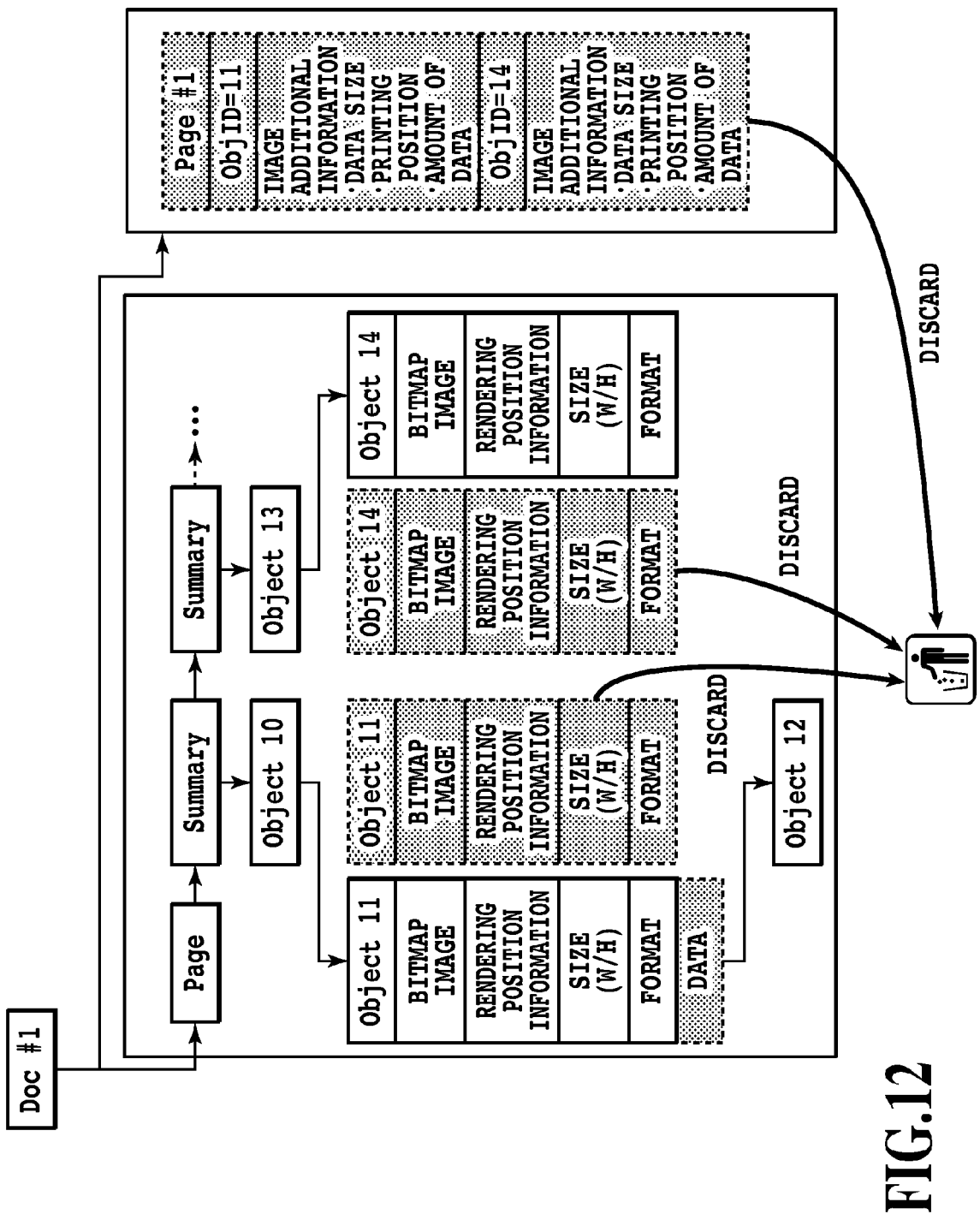
FIG. 12 is a diagram showing a data structure of the document file after editing processing of scan data.

FIG. 12 shows the data structure of the document file after the editing processing of the scan data.

Next, the transfer processing of the original document data will be described.

The processing is executed by the control unit 200 of the document storage device.

FIG. 17 is a flowchart showing a flow of the processing.

At step S1701, the document storage device receives from the printing executing device the data transfer request of the original document, the transfer size information on the bitmap data and the function information on the printing executing device (S1504 of FIG. 15).

At step S1702, according to the information on the original document it receives at step S1701, the document storage device searches the original document requested to transfer.

At step S1703, the document storage device determines as to whether it stores the original document requested to transfer or not. Unless it stores the original document, the document storage device proceeds to the processing at step S1709, and if it stores the original document, it proceeds to the processing at step S1704.

At step S1704, the document storage device transmits the document transfer enabled message indicating that the transfer of the original document is possible to the printing executing device that transmits the data transfer request of the original document.

At step S1709, the document storage device transmits the document transfer disabled message indicating that the transfer of the original document is impossible to the printing executing device that transmits the data transfer request of the original document.

At step S1705, according to the transfer size information on the bitmap data, the document storage device executes the editing processing of the metadata. Details of the editing processing of the metadata will be described later.

At step S1706, the document storage device transmits the edited metadata to the printing executing device.

Figure 11:
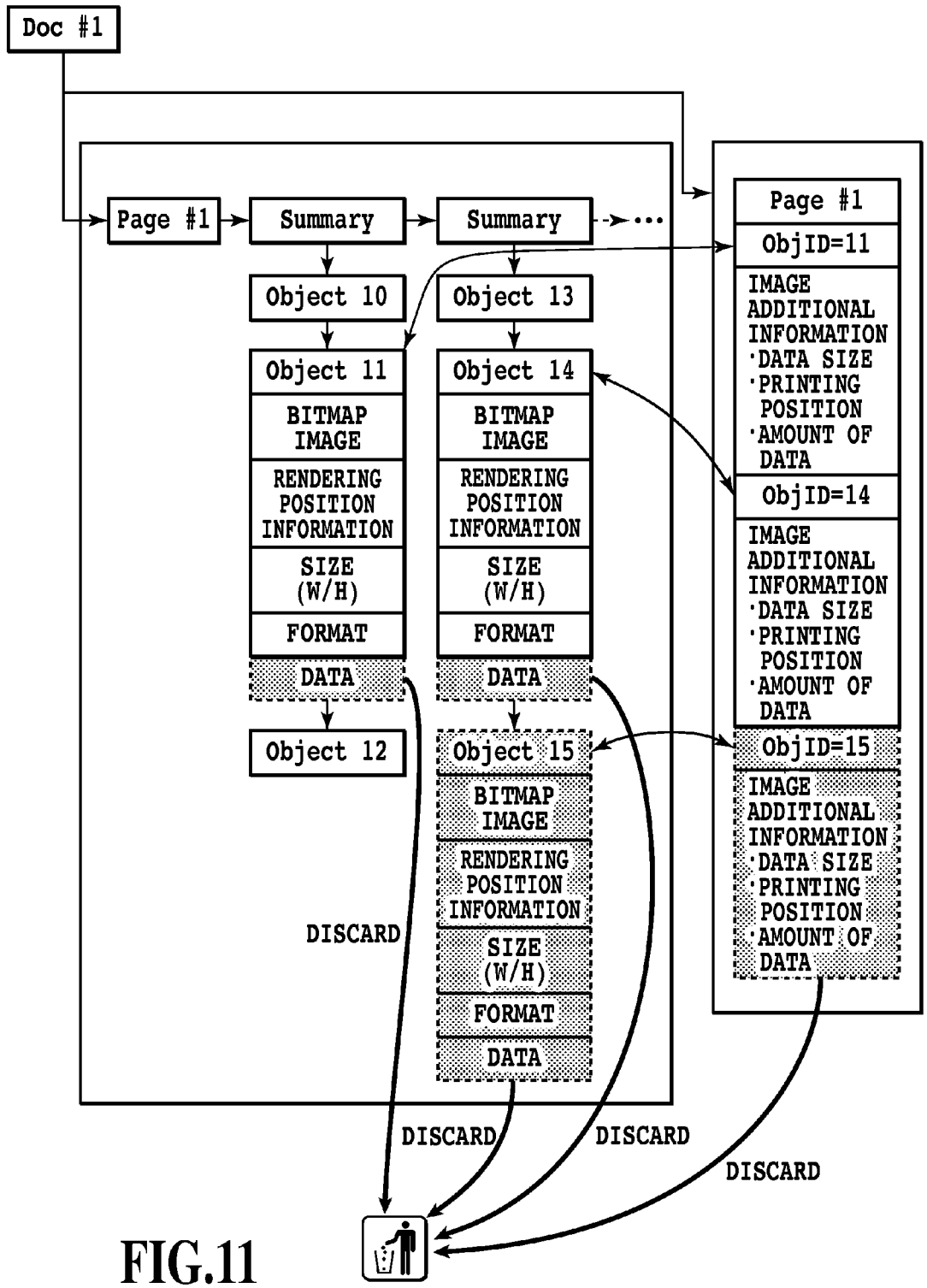
FIG. 11 is a diagram showing the data structure of the document file after editing processing of the metadata and vector data.

At step S1707, the document storage device edits the vector data according to the edited metadata. Here, FIG. 11 shows the metadata and the data structure of the document file after the editing processing of the vector data.

At step S1708, the document storage device transmits the vector data edited to the printing executing device, and thus completes the transfer processing of the original document data.

Next, the editing processing of the metadata (step S1705) will be described.

Figure 18:
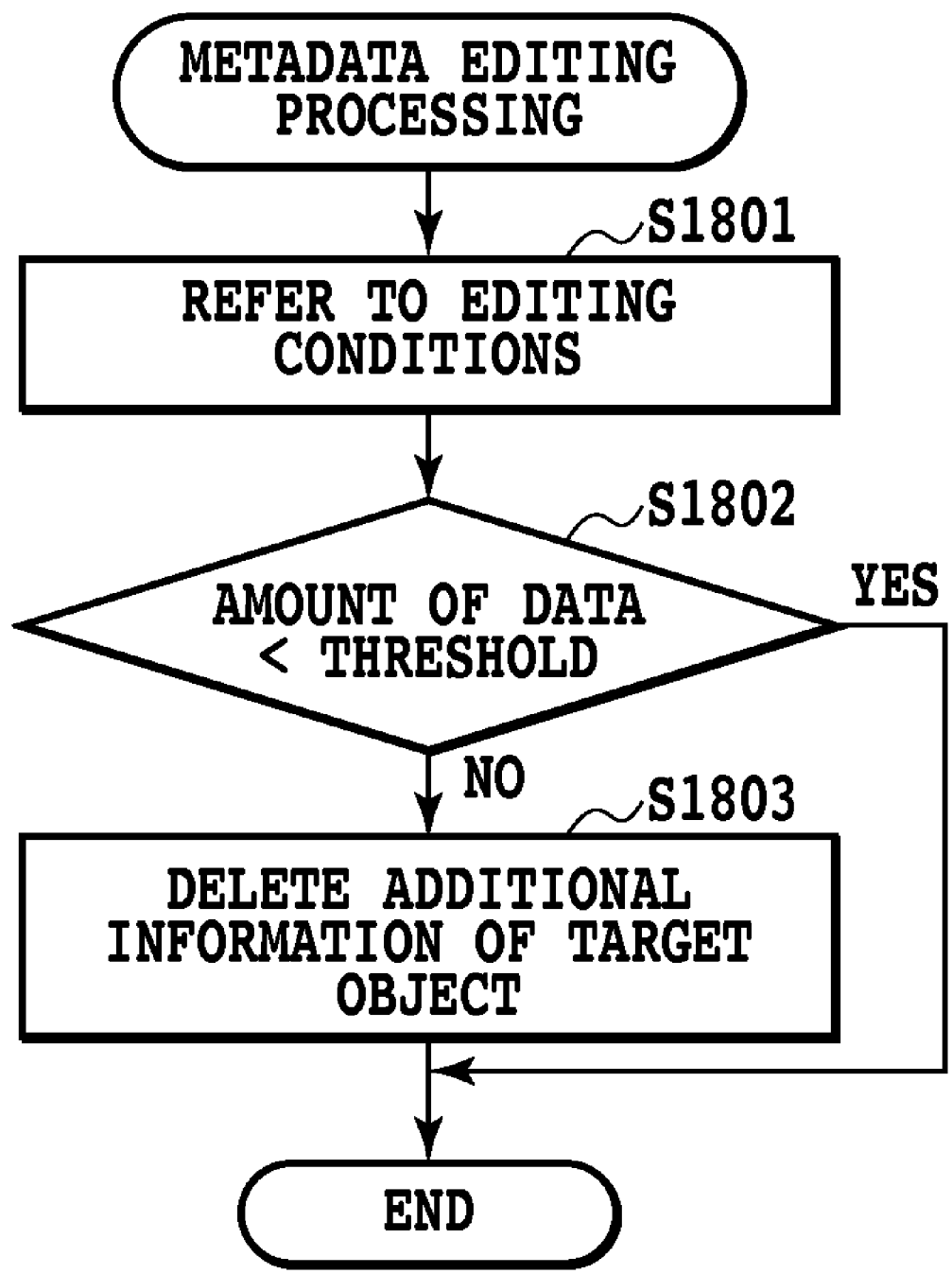
FIG. 18 is a flowchart showing a flow of the editing processing (step S1705) of the metadata the document storage device executes.

FIG. 18 is a flowchart showing a flow of the processing.

At step S1801, the document storage device refers to the transfer size information on the bitmap data, the function information on the printing executing device and the like it receives at step S1701 as editing condition information.

At step S1802, using the transfer size information on the bitmap data it refers to as a threshold (upper limit value), the document storage device compares the threshold with the data size (width and height) contained in the image additional information within the metadata. If the data size (width and height) is greater than the threshold, the document storage device proceeds to the processing at step S1803. Then, the document storage device deletes the information on the object with the data size from the metadata, and proceeds to the processing at step S1707. In contrast to this, if the data size (width and height) is not greater than the threshold, the document storage device proceeds to the processing at step S1707.

In this way, according to the transfer size information on the bitmap data transmitted from the printing executing device, the document storage device deletes from the metadata the information on the bitmap image object with the data size greater than the transfer size of the bitmap data. Thus, the document storage device edits the metadata in accordance with the transfer size information on the bitmap data, and transmits the metadata after editing to the printing executing device. In addition, at step S1707, the document storage device edits the vector data in accordance with the metadata edited, and transmits the vector data after editing to the printing executing device. In other words, the document storage device does not transmit the bitmap image object with the data size greater than the bitmap data transfer size the printing executing device designates to the printing executing device. On the other hand, to complement the object that is not transmitted, the printing executing device converts the scan data corresponding to the bitmap image object not transmitted to the vector data through the scan data editing processing, and completes the bitmap image object. As for the information transmitted from the printing executing device, it can be information such as high quality or high speed (information on image quality or speed) rather than the transfer size. In this case, the document storage device prepares a matching table in connection with the information received such as high quality or high speed, and selects the first transfer size in the case of "high speed" and the second transfer size in the case of "high quality" (the first transfer size is smaller than the second transfer size). Then, according to the matching table, the document storage device identifies the transfer size from the information received, and edits the metadata and the vector data.

In the foregoing embodiment, the document storage device does not transmit the bitmap image object with the data size (width and height) greater than the data size set in the printing executing device. As a result, the embodiment can reduce the amount of data to be transmitted to the printing executing device, and increase the transfer rate of the data. When the document storage device deletes the bitmap image object in this way, the printing executing device utilizes at least part of the scan data instead of the bitmap image object deleted and S1509). Accordingly no omission of the bitmap image object occurs from the printout by the printing executing device.

The foregoing embodiment employs a method of editing the document file (metadata and vector data) in accordance with the transfer size information on the bitmap data the user designates. In the following, as a second embodiment, a method will be described of editing the metadata in accordance with the original document information, the printing information on the document scanned, and the device information on the printing executing device.

Figure 19:
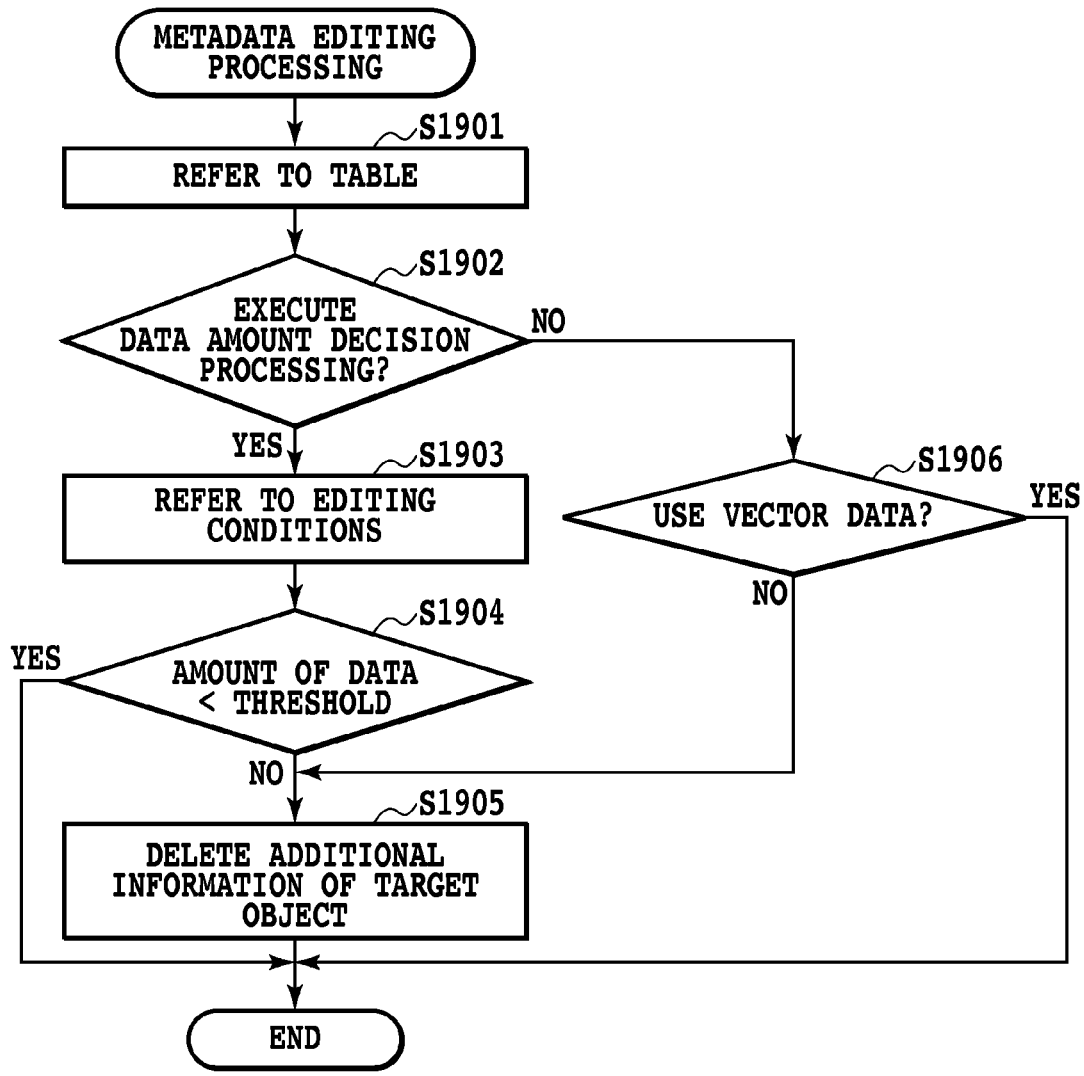
FIG. 19 is a flowchart showing a flow of the metadata editing processing (step S1705 of FIG. 17)

FIG. 19 is a flowchart showing the metadata editing processing (step S1705 of FIG. 17).

At step S1901, the document storage device refers to a table that defines conditions whether to edit the metadata or not. FIG. 20 shows a table referred to when switching the processing in accordance with the color processing, and FIG. 21 shows a table referred to when switching the processing in accordance with the resolution.

Referring to FIG. 20, data amount determination processing is selected when the original document is colored, and both the scanned image and document printout image are colored, for example. When the original document is colored, the scanned image is colored, and the document printout image is monochrome, using the scan data preferentially is selected. When the original document is colored, the scanned image is monochrome, and the document printout image is colored, using the original document data preferentially is selected.

Referring to FIG. 21, the data amount determination processing is selected when the original document has high resolution, and the scanned image and document printout image have high resolution. When the original document has high resolution, the scanned image has low resolution, and the document printout image has high resolution, using the original document data preferentially is selected.

At step S1902, the document storage device determines whether to execute the data amount determination processing or not by comparing the conditions the table referred to at step S1901 defines with the conditions at the time of executing the original document printing processing. As the conditions, there are performance of the scanner and that of the printer (color-capable/monochrome-capable, and high resolution/low resolution).

If the document storage device determines of executing the data amount determination processing, it proceeds to the processing at step S1903, but if it does not determine of executing the data amount determination processing, it proceeds to the processing at step S1906.

At step S1903, the document storage device refers, as the editing condition information, to the transfer size information on the bitmap data, the function information on the printing executing device and the like it receives at step S1701 of FIG. 17.

At step S1904, using the transfer size information on the bitmap data as a threshold, the document storage device compares the threshold with the data size (width and height) the image additional information within the metadata has. If the amount of data is greater than the threshold, the document storage processing device proceeds to the processing at step S1905, and deletes the information about the target object from the metadata.

At step S1906, the document storage device follows the conditions the table it refers to at step S1901 defines. When determining that it does not use the vector data (give higher priority to the scan data), the document storage device proceeds to the processing at step S1905, and deletes the object ID and image additional information from the metadata. When determining that it uses the vector data, the document storage device completes the processing without editing the metadata.

As described above, the foregoing second embodiment can provide a system that considers the case where the printout image on a paper medium or the performance of the scanner is inferior. More specifically, it can not only perform the color printing even when the scanned image is monochrome, but also make the scanned image available when the scanned image has higher resolution. With the foregoing configuration, the embodiment can provide the output processing considering the image quality and the time necessary for the data transfer. When executing the original document printing with the foregoing configuration, the transfer of the object with large data size is inhibited and the printing is carried out using the scanned image as a substitute for the object not transferred. This enables speedup of the data transfer of the object file and improvement of the quality of the printed image.

Other Embodiments

The present invention can be employed in various embodiments such as a system, device, method, computer program or computer readable recording medium. In addition, the present invention is applicable to a system comprising a plurality of devices or to a single device.

An embodiment in accordance with the present invention includes the case where a computer program capable of achieving the functions of the present invention described above is installed in a system or device via a recording medium or network, and a computer the system or device has executes the program. The recording medium is a computer readable recording medium. Accordingly, the embodiment includes a computer program itself that achieves the functions of the present invention. The computer program includes object code, a program executed by an interpreter, and script data supplied to an OS. As the recording medium, there are a variety of mediums such as a floppy (registered trademark) disk, hard disk, optical disk, magneto-optical disk, MO, CD-ROM, CD-R, CD-RW, magnetic tape, nonvolatile memory card, ROM and DVD. As a method of supplying the program, there is a method of downloading from the Internet to a recording medium like a hard disk using a browser of a client computer. The method downloads from the Internet the files of computer programs or files that are compressed and include an automatic installation function. In addition, the embodiments include a case of dividing the program code constituting the computer program into a plurality of files, and of downloading the individual files from different servers. Furthermore, the embodiments include a server that causes a plurality of users to download the files of the computer program.

A computer can achieve the functions of the foregoing embodiments by executing the computer program. In addition, an OS and the like working on the computer can achieve the functions of the foregoing embodiments by performing part or all of the actual processing according to the instructions of the computer program.

Furthermore, the functions of the foregoing embodiments can also be implemented after the computer program read out of the recording medium has been written onto a memory included in a function expansion board inserted into a computer or in a function expansion unit connected to the computer. In other words, the CPU in the expansion board or in the expansion unit can achieve the functions of the foregoing embodiments by performing part or all of the actual processing according to the instructions of the computer program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-041966, filed Feb. 22, 2008, which is hereby incorporated by reference herein in its entirety.

What is claimed is:

1. A storage device configured to transmit requested data to an image processing device, the device comprising:
    an analyzing unit configured to analyze page description language data, and to generate vector data and metadata from analysis results;
    a storing unit configured to store, in the storage device, a document file including the vector data and the metadata, the metadata including a data size of each of a plurality of objects;
    a receiving unit configured to receive, from the image processing device, a transfer request for the document file and transfer size information;
    a searching unit configured to search a requested document file stored by the storage device in accordance with the received transfer request;
    an editing unit configured to delete, from the document file, the metadata and vector data corresponding to an object of which a data size is greater than a data size included in the received transfer size information; and
    a transmitting unit configured to transmit the metadata and the vector data that are not deleted by the editing unit, to the image processing device.

2. The device as claimed in claim 1, wherein the transfer size information is information a user sets to the image processing device, and indicates an upper limit value of the transfer size of a bitmap image object.

3. The device as claimed in claim 2, wherein the editing unit compares the upper limit value of the transfer size information with the data size of each object included in the metadata, and deletes, from the document file, the metadata and the vector data corresponding to the object of which the data size is greater than the upper limit value of the transfer size information.

4. The device as claimed in claim 1, further comprising a determining unit configured to determine whether the editing unit deletes the metadata in accordance with functions of a scanner and a printer of the image processing device.

5. An image processing system comprising a storage device and an image processing device configured to transmit a data transfer request to the storage device and receive requested data,
wherein the image processing device includes:
  a unit configured to read a document and to generate original image data;
  a unit configured to input transfer size information;
  a unit configured to detect information of the storage device that stores a document file including data about the document from at least part of an area of the original image data;
  a unit configured to transmit, in accordance with the detected information, a transfer request for the document file and the transfer size information to the storage device that stores the document file;
  a unit configured to receive the requested document file from the storage device, the received document file being edited in accordance with the transfer size information; and
  a unit configured to extract at least part of the original image data, and to generate an image by combining the extracted part with the vector data included in the received document file,
wherein the storage device includes:
  an analyzing unit configured to analyze page description language data, and to generate vector data and metadata from analysis results;
  a storing unit configured to store the document file including both the vector data and the metadata, in the storage device, the metadata including information of a data size of each of a plurality of objects;
  a receiving unit configured to receive the transfer request for the document file and the transfer size information from the image processing device;
  a search unit configured to search a requested document file stored by the storage device in accordance with the received transfer request;
  an editing unit configured to delete, from the document file, the metadata and the vector data corresponding to an object of which a data size is greater than a data size included in the received transfer size information; and
  a transmitting unit configured to transmit the metadata and the vector data that are not deleted by the editing unit, to the image processing device.

6. The image processing device as claimed in claim 5, wherein the transfer size information is information a user sets to the image processing device, and indicates an upper limit value of the transfer size of a bitmap image object.

7. A method of transmitting requested data to an image processing device, the method comprising steps of:
  analyzing page description language data, and generating vector data from metadata from analysis results;
  storing a document file which is recorded by the vector data and the metadata, into a storage device, the metadata including information of data size of each of a plurality of objects;
  receiving a transfer request for the document file and transfer size information from the image processing device;
  searching for a requested document file stored by the storage device in accordance with the received transfer request;
  deleting, from the document file, the metadata and the vector data corresponding to an object of which a data size is greater than a data size included in the received transfer size information; and
  transmitting the metadata and the vector data that are not deleted by the editing unit, to the image processing device.

8. A method of transmitting a data transfer request from an image processing device to a storage device and receiving data requested, the method comprising steps of:
  reading a document and generating original image data;
  inputting transfer size information;
  detecting information of the storage device that stores a document file including data about the document from at least part of an area of the original image data;
  transmitting in accordance with the detected information, a transfer request for the document file and the transfer size information to the storage device that stores the document file;
  receiving the requested document file from the storage device in accordance with the transfer size information, the received document file being edited; and
  extracting at least part of the original image data, and generating an image by combining the extracted part with the vector data included in the received document file,
  analyzing page description language data and generating vector data and metadata from analysis results;
  storing the document file including both the vector data and the metadata, the metadata including information of a data size of each of a plurality of objects;
  receiving the transfer request for the document file and the transfer size information from the image processing device;
  searching for a requested document file in accordance with the received transfer request;
  deleting, from the document file, the metadata and the vector data corresponding to an object of which a data size is greater than a data size included in the received transfer size information; and
  transmitting the metadata and the vector data that are not deleted by the editing unit, to the image processing device.

* * * * *